United States Patent [19]
Baechler et al.

[11] Patent Number: 5,695,208
[45] Date of Patent: Dec. 9, 1997

[54] BABY STROLLER CONVERSION ASSEMBLY

[75] Inventors: Philip A. Baechler; Joseph P. Delorme; Michael F. Arnold, all of Yakima, Wash.

[73] Assignee: Racing Strollers, Inc., Yakima, Wash.

[21] Appl. No.: 530,787

[22] Filed: Sep. 19, 1995

[51] Int. Cl.⁶ .................................................. B62K 27/12
[52] U.S. Cl. ............................... 280/204; 280/47.38
[58] Field of Search .............................. 280/202, 204, 280/47.34, 47.38, 47.39, 47.4, 47.41

[56] References Cited

U.S. PATENT DOCUMENTS

| | | | |
|---|---|---|---|
| D. 356,761 | 3/1995 | Jacobs et al. | D12/129 |
| 5,076,599 | 12/1991 | Lockett et al. | 280/204 |
| 5,176,395 | 1/1993 | Garforth-Bles | 280/204 |
| 5,259,634 | 11/1993 | Berner et al. | 280/204 |
| 5,267,744 | 12/1993 | Berry et al. | 280/204 |
| 5,318,318 | 6/1994 | Berner et al. | 280/204 |
| 5,344,171 | 9/1994 | Garforth-Bles | 280/415.1 |
| 5,421,597 | 6/1995 | Berner | 280/204 |
| 5,454,577 | 10/1995 | Bell | 280/204 |
| 5,454,578 | 10/1995 | Neack | 280/204 |
| 5,460,395 | 10/1995 | Chen | 280/204 |
| 5,474,316 | 12/1995 | Britton | 280/204 |
| 5,577,746 | 11/1996 | Britton | 280/204 |
| 5,599,033 | 2/1997 | Kolbus et al. | 280/204 |

OTHER PUBLICATIONS

*Jog'r Cycle*, Motive Sports Inc., Tustin, California.

*Primary Examiner*—Kevin Hurley
*Attorney, Agent, or Firm*—Seed and Berry LLP

[57] ABSTRACT

An assembly for converting a three-wheeled baby stroller to a two-wheeled bicycle trailer configuration. The conversion assembly includes an upper frame attachment attached to the upper stroller frame. Left and right support members are connected to a forward portion of the upper frame attachment and extend downward and each have at a lower end thereof an axle extension assembly. This assembly is positioned between the end of the stroller rear axle and the stroller rear wheel to extend the rear wheel base of the stroller to provide increased stability. A tow arm assembly extends from a forward end of the upper frame attachment and at a forward end thereof carries a hitch which clamps to the seatpost of a bicycle. An elongated baseplate is positioned at the forward end of the stroller lower frame and securely clamped thereto. Left and right side suspension members are attached at an upper end to the tow-arm assembly and at a lower end to the baseplate and support the front end of the stroller frame when the front wheel thereof is removed. The baseplate further serves as a carrier for the removed front wheel. The base plate has a connector positioned forward of the stroller connectors which receive the lower ends of the stroller upper frame tubes. With the lower ends of the stroller upper frame tubes moved forward into the baseplate connector, the center of gravity of the stroller seat is moved forward and is lowered to provide increased stability. The left and right side suspension members also serve to transmit lifting forces produced on the rear wheels of the stroller to the seatpost of the bicycle so that the weight of the rider on the bicycle counters the lifting force to inhibit tipping and rolling.

82 Claims, 7 Drawing Sheets

BABY STROLLER CONVERSION ASSEMBLY

TECHNICAL FIELD

The present invention relates to three-wheeled baby strollers, and more particularly, to an assembly for converting the three-wheeled baby stroller to a two-wheeled bicycle trailer.

BACKGROUND OF THE INVENTION

All-terrain, three-wheeled baby strollers have been designed to be pushed by parents while jogging, fast walking or even just slow walking in grassy parks and on rough roads and sidewalks. Such strollers use large wheels to accommodate the rough terrain. While such strollers allow parents to take infants along when jogging and walking, there are times when parents wish to ride their bicycles for exercise or fun. While bicycle seats are available so that an infant can ride along, some find it more convenient and safer to use a trailer which is towed by the bicycle. Such trailers use large wheels to accommodate rough terrain, as do all terrain, three-wheeled strollers, but usually utilize only two large rear wheels.

For those parents who already have a three-wheeled stroller or do not wish to purchase both a three-wheeled stroller and a bicycle trailer, it would be desirable to provide a conversion assembly to simply convert a three-wheeled baby stroller to a two-wheeled bicycle trailer. Such a conversion assembly should be easy and quick to attach to the three-wheeled stroller to convert it to a two-wheeled bicycle trailer, and easy and quick to remove to reconvert the bicycle trailer to a stroller. Such a conversion assembly would eliminate the need and expense to purchase a separate bicycle trailer. The bicycle trailer that results from use of the conversion assembly should be stable and safe for the infant occupant.

It can be appreciated that a substantial need exists for a baby stroller conversion assembly for use to convert an all terrain, three-wheeled baby stroller to a two-wheeled bicycle trailer. The present invention provides such a conversion assembly.

SUMMARY OF THE INVENTION

The present invention resides in a conversion assembly for use with a baby stroller having a forward wheel, left and right rearward wheels rotatably mounted on left and right stub axles, and a rear axle having left and right ends with corresponding left and right end openings to removably receive a corresponding one of the left and right stub axles therein. The stroller has a downwardly sloping upper frame supporting a baby seat. The upper frame has a lower end and an upper end. A handle is connected to the upper frame toward the upper end thereof.

The stroller further includes a base frame with a forward end and a rearward end. The forward wheel is removably attached to the base frame toward the forward end thereof. The base frame has a connector at a position toward the forward wheel to releasably attach the lower end of the upper frame to the base frame.

The stroller has an upwardly extending frame with an upper end pivotally connected to the upper frame at a position between the handle and the lower end of the upper frame. The upwardly extending frame is rotatable relative to the base frame to permit the lower end of the upper frame to selectively move forward with the forward wheel removed.

The conversion assembly of the present invention is usable to couple the baby stroller in the configuration of a two-wheeled bicycle trailer to a bicycle having a frame supporting a bicycle seat.

The conversion assembly includes an upper frame attachment having a rearward upper frame attachment portion pivotally connected to the upper frame of the baby stroller at a position toward the handle. The upper frame attachment also includes a forward attachment portion. The conversion assembly also includes left and right support members, each having an upper end portion pivotally connected to the forward attachment portion and a lower end portion having an axle extension assembly. The axle extension assemblies each have an inner stub axle removably positionable in a corresponding one of the left and right end openings of the rear axle when the rearward wheel stub axle is removed therefrom. Each axle assembly also includes an outer opening to removably receive a corresponding one of the left and right rearward wheel stub axles therein.

The conversion assembly has a tow-arm having a rearward end portion connected to the forward attachment portion. The tow-arm also has a forward tow-arm end portion positionable toward the bicycle seat.

The conversion assembly has a base frame attachment having a releasable connector securable to the base frame toward the forward end thereof. The base frame attachment also includes an upper frame connector positioned forward of the connector of the base frame to releasably attach the lower end of the upper frame to the base frame attachment. The conversion assembly has a suspension member with an upper end portion connected to the tow-arm and a lower end portion connected to the base frame attachment. A hitch is attached to the forward tow-arm end portion to couple the tow-arm to the bicycle frame at a position toward the bicycle seat.

The conversion assembly is useful with a baby stroller upper frame having left and right upper frame members. The upper frame attachment includes left and right attachment members with each having a rearward end portion pivotally connected to a corresponding one of the left and right upper frame members. The left and right attachment members also have a forward end portion. The upper frame attachment further includes a forward attachment member extending between the forward end portions of the left and right attachment members. The upper end portions of the left and right support members are pivotally connected to a corresponding one of the left and right attachment members toward the forward attachment member.

The tow-arm includes laterally spaced-apart left and right tow-arm members. Each of the tow-arm members has a rearward end portion connected to the forward attachment portion at spaced-apart locations. The tow-arm members also include a forward end portion. The forward end portions of the left and right tow-arm members are connected together, and the hitch is connected to both of the forward end portions of the left and right tow-arm members.

The suspension member includes laterally spaced-apart left and right suspension members. Each of the suspension members has an upper end portion connected to a corresponding one of the left and right tow-arm members at a spaced-apart distance. The lower end portions of the left and right suspension members are connected to the base frame attachment with a distance therebetween less than the spaced-apart distance of the upper end portions. This provides the left and right suspension members with a V-shaped arrangement when viewed from the direction of the rear axle.

In the preferred embodiment, the base frame attachment is a plate. The plate has an aperture for receiving a threaded axle and nut of the forward wheel to allow the forward wheel to be clamped to the plate for carrying when removed from the stroller for two-wheeled bicycle trailer operation.

A canopy is supported by the upper frame attachment and defines an enclosure having the baby seat therewithin.

Other features and advantages of the invention will become apparent from the following detailed description, taken in conjunction with the accompanying drawings.

DETAILED DESCRIPTION OF THE INVENTION

Figure 1:
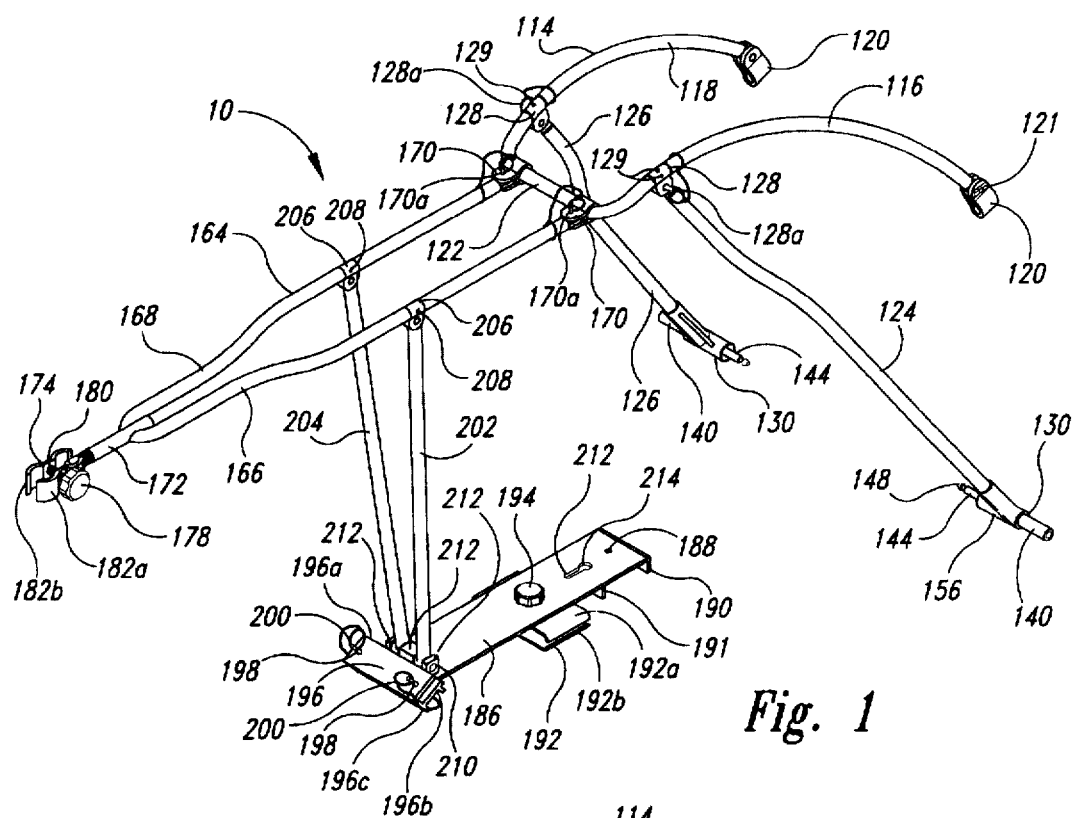
FIG. 1 is an isometric view of a conversion assembly embodying the present invention used to convert a baby stroller shown in FIG. 3 into a two-wheeled bicycle trailer (shown in FIG. 2).
Figure 2:
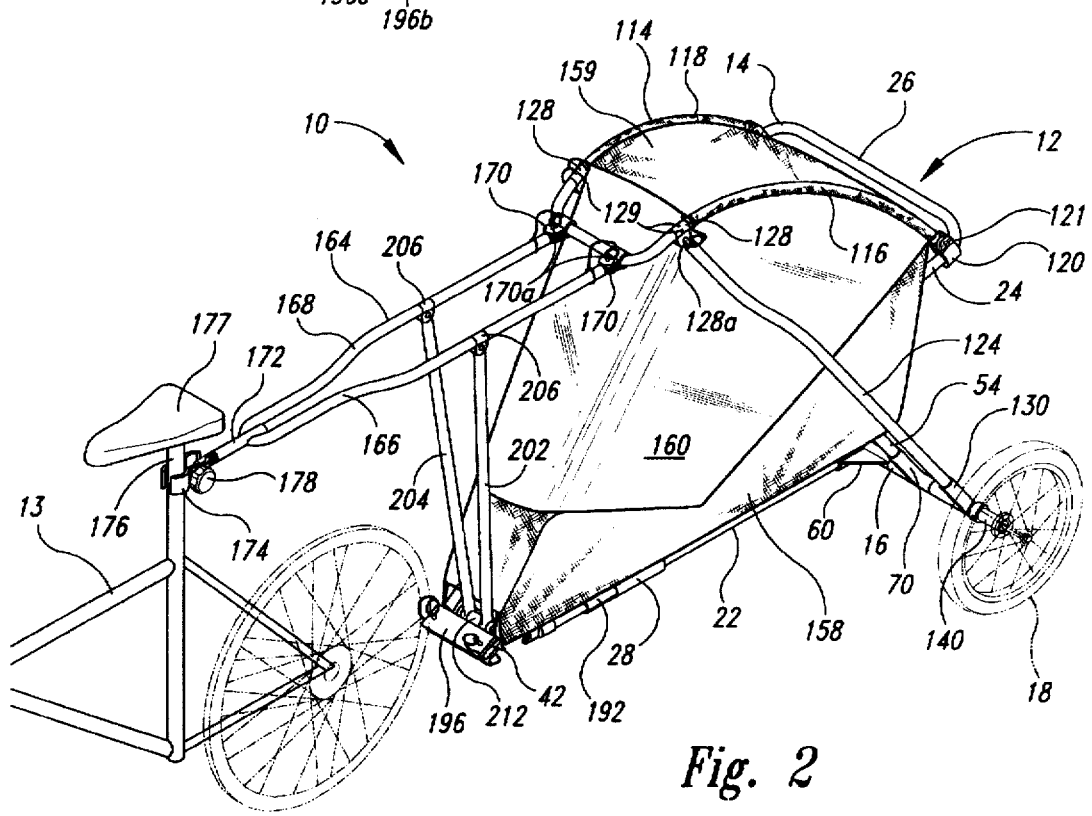
FIG. 2 is an isometric view of a two-wheeled bicycle trailer using the conversion assembly of the present invention shown connected to a bicycle for towing.
Figure 3:
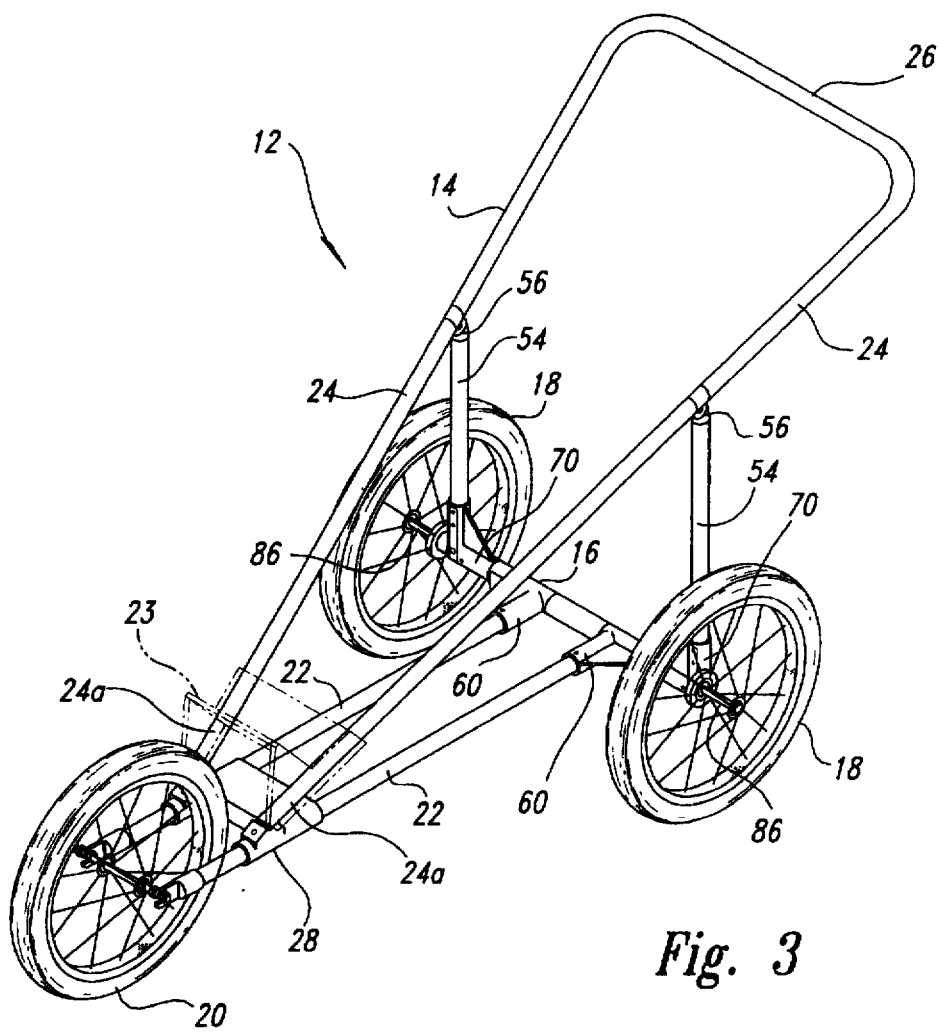
FIG. 3 is an isometric view of a three-wheeled baby stroller with which the conversion assembly of the present invention is used, the stroller being shown in an upright position for use, but with its seat removed.

As shown in the drawings for purposes of illustration, the present invention is embodied in a conversion assembly 10, shown in FIG. 1, for converting an all-terrain baby stroller 12, shown in FIG. 3, into a bicycle trailer, shown in FIG. 2, attached to a bicycle 13 for towing. The baby stroller 12, as best illustrated in FIG. 3, has a foldable frame 14 and a transversely extending rear axle assembly 16 designed to permit folding of the frame and selective removal of the two rear wheels 18 rotatably mounted to the rear axle assembly. The forward end of the frame 14 has a single front wheel 20 rotatably mounted thereto. The frame 14 includes left and right side horizontal base frame tubes 22 extending rearwardly from the front wheel 20 in parallel configuration to the rear axle assembly 16.

The frame 14 also includes left and right, downwardly sloping upper frame tubes 24 which extend from a handle 26 used to push the stroller 12 in converging configuration to the horizontal base frame tubes 22 at a position near the rearwardmost extent of the front wheel 20. A footrest 23, shown in phantom line in FIG. 3, is affixed to both of the upper frame tubes 24 and rigidly holds the forward portions of the upper frame tubes in a fixed spaced-apart relation.

Figure 4:
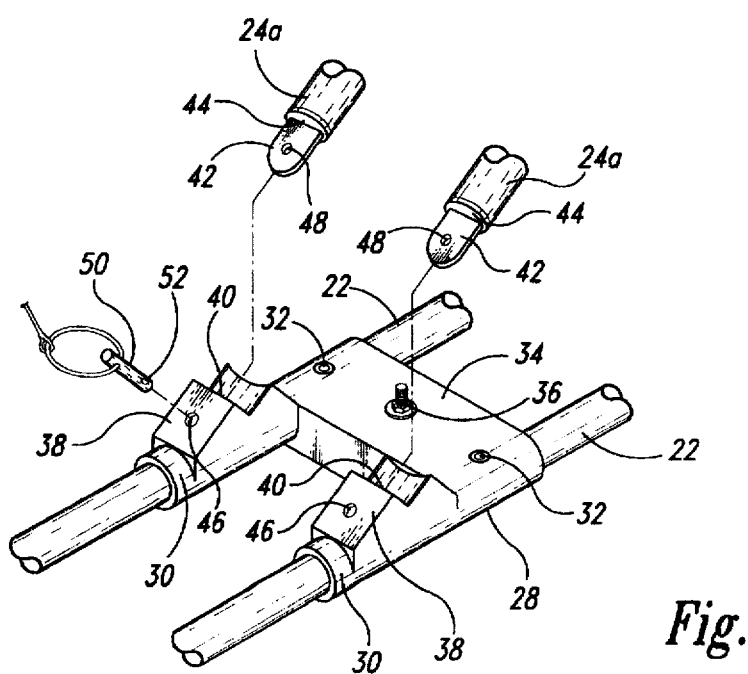
FIG. 4 is an enlarged, fragmentary, isometric view of a front frame connector used for the stroller of FIG. 2.

As best shown in FIG. 4, a lower terminal end 24a of each upper frame tube 24 is releasably coupled to the horizontal base frame tubes 22 by a frame connector 28 affixed to both of the horizontal base frame tubes. The frame connector 28 has left and right tube receiver portions 30 through which the horizontal base frame tubes 22 extend. The frame connector 28 is fixed in place on the horizontal base frame tubes 22 at a position near the rearwardmost extent of the front wheel 20 using rivets 32. A bridge portion 34 of the frame connector 28 spans between the left and right tube receiver portions 30 to rigidly hold the two horizontal base frame tubes 22 in a fixed spaced-apart relation and also provide a platform to which a front wheel caliper brake (not shown) is attached therebelow by a bolt 36.

The frame connector 28 has left and right connector portions 38, each positioned above a forward end portion of a corresponding one of the left and right tube receiver portions 30. Each connector portion 38 has a slot 40 therein sized to removably receive a tongue portion 42 of a fitting 44 fixedly attached to the lower terminal end 24a of a corresponding one of the upper frame tubes 24. The tongue portion 42 is sized to fit snugly within a corresponding one of the connector slots 40. An aperture 46 is formed in each connector portion 38 and a corresponding aperture 48 is formed in each tongue portion 42 of the fittings 44 so that the apertures 46 and 48 will be in alignment when the tongue portion is inserted within the corresponding connector portion. The apertures 46 and 48 are sized to receive a removable lock pin 50 with a detent ball 52 snugly therein to securely hold the tongue portion 42 within the corresponding connector portion 38, and thereby rigidly attach the upper frame tubes 24 to the horizontal base frame tubes 22. When desired for folding of the frame 12 for compact transport or storage, the two lock pins 50 are removed and the tongue portions 42 pulled out of the connector slots 40 for detachment of the lower terminal end 24a of the upper frame tubes 24 from the horizontal base frame tubes 22.

The frame 14 further includes left and right upright support tubes 54 extending between the rear axle assembly 16 and the upper frame tubes 24 at a position below and forward of the handle 26. The upright support tubes 54 are pivotally connected to the upper frame tubes 24 by left and right pivot joints 56, and fixedly connected to the axle assembly 16 by couplers, as will be described below to permit folding of the stroller 12 when the tongue portion 42 of the fittings 44 are released to free the lower terminal ends 24a of the upper frame tubes 24 from the horizontal base frame tubes 22.

Figure 5A:
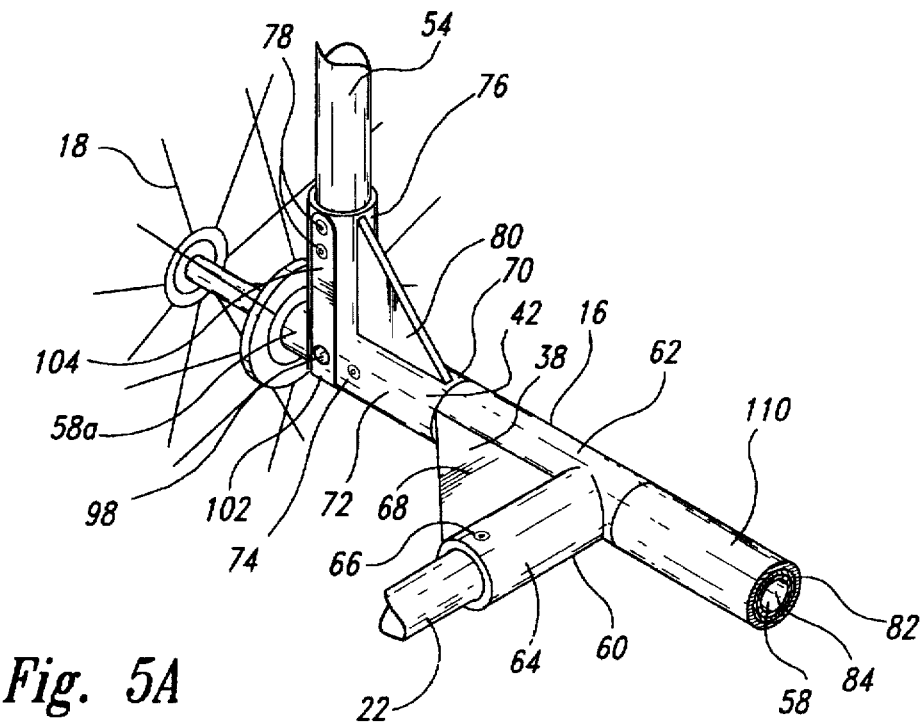
FIG. 5A is an enlarged, fragmentary, isometric view of the right side of the axle assembly of FIG. 3 with the right rear wheel attached to the rear axle.
Figure 5B:
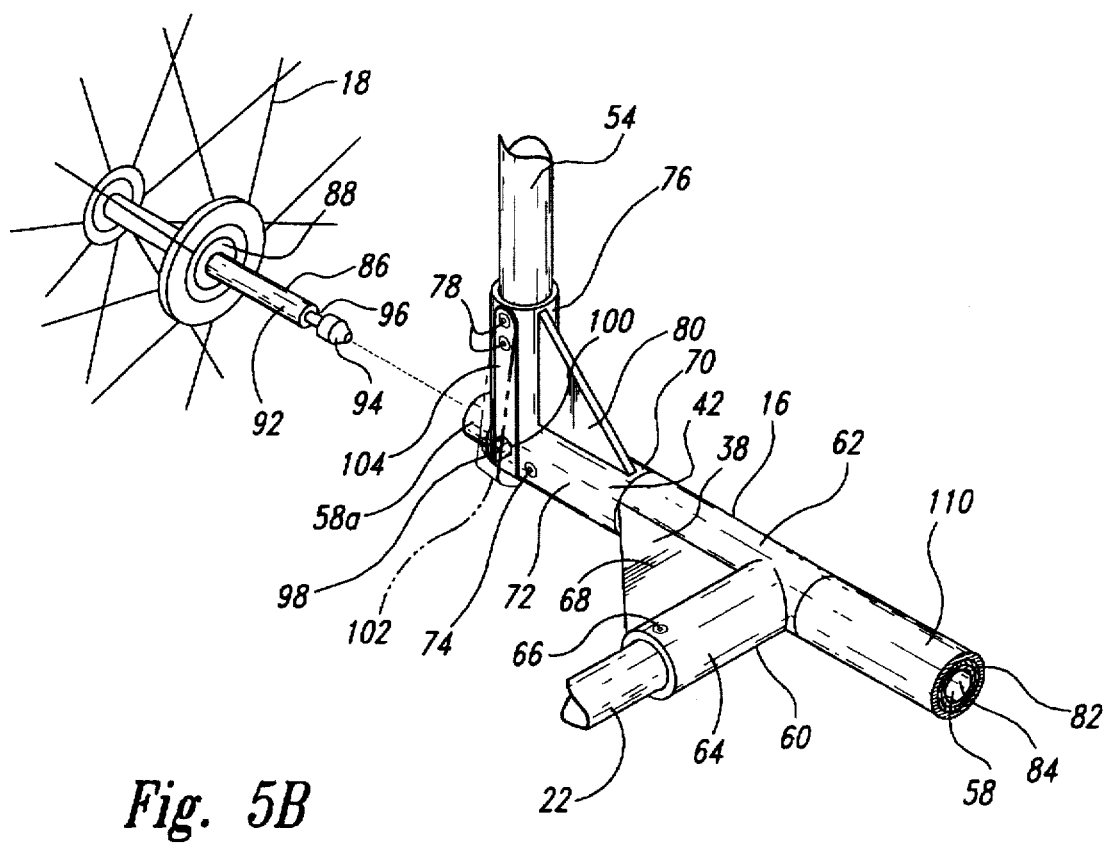
FIG. 5B is an enlarged fragmentary, isometric view of the right side of the axle assembly of FIG. 3 shown with the right rear wheel shown removed from the rear axle.

As shown in FIGS. 5A and 5B, the rear axle assembly 16 uses a non-rotating tubular rear axle 58. Each of the horizontal base frame tubes 22 is coupled to the rear axle 58 by a first coupler 60 with a tubular connector portion 62 rotatably receiving the rear axle 58 therethrough to permit rotation of the horizontal base frame tubes relative to the rear axle upon folding of the frame 14 for storage or transport, or as will be described below, for attachment of conversion assembly 10 to the stroller 12. The first coupler 60 also has a frame tube receiver portion 64 within which a corresponding one of the left or right horizontal base frame tubes 22 is inserted and fixed in place using rivets 66. A gusset 68 is fixedly attached to both the tubular connector portion 62 and the frame tube receiver portion 64 of each first coupler 60 to rigidly hold them together.

Each of the upright support tubes 54 is coupled to the rear axle 58 by a second coupler 70 with a tubular connector portion 72 receiving the rear axle 58 therein. The tubular connector portion 72 and the rear axle 58 are fixedly attached together by rivets 74. The rear axle 58 has left and right end portions 58a that project outward beyond the outer end of each of the tubular connector portions 72. The second coupler 70 also has a frame tube receiver portion 76 within which a corresponding one of the left or right upright support tubes 54 is inserted and fixed in place using rivets 78. A gusset 80 is fixedly attached to both the tubular connector portion 72 and the frame tube receiver portion 76 of each second coupler 70 to rigidly hold them together. As a result, the upright support tubes 54 and the rear axle 58 are fixed together and rotate as a unit when the frame 14 is folded. With this arrangement, the first coupler 60, which holds one of the horizontal base frame tubes 22, and the second coupler 70, which holds one of the upright support tubes 54, can be freely rotated relative to each other by a sufficient amount to allow the folding of the upright support tubes downward relative to the horizontal base frame tubes for folding of the stroller 12 or attachment of the conversion assembly 10.

Figure 6A:
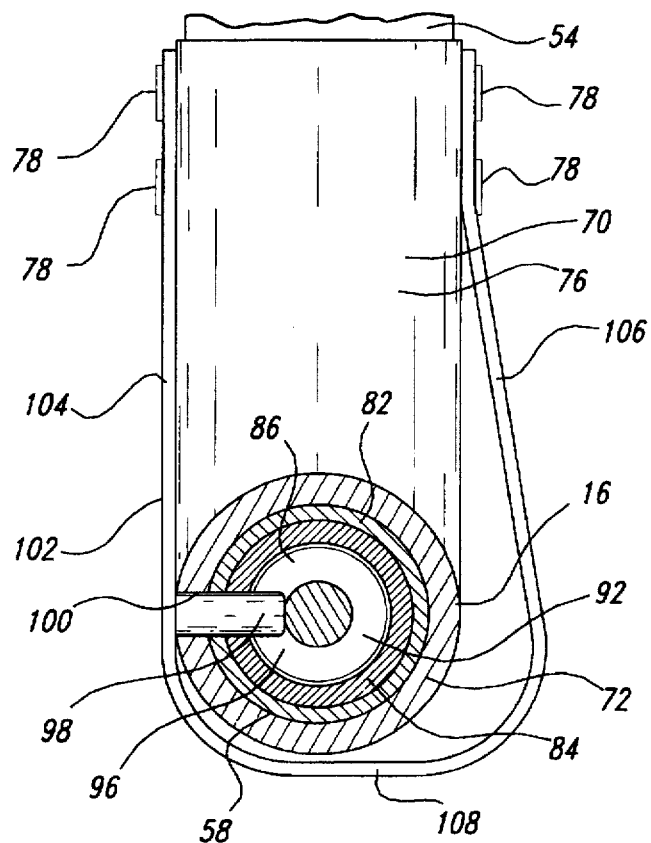
FIG. 6A is an enlarged, cross-sectional, left side elevational view of the lock mechanism of the axle assembly of FIG. 3 shown in an engaged position to lock the stub axle in position within the rear axle.
Figure 6B:
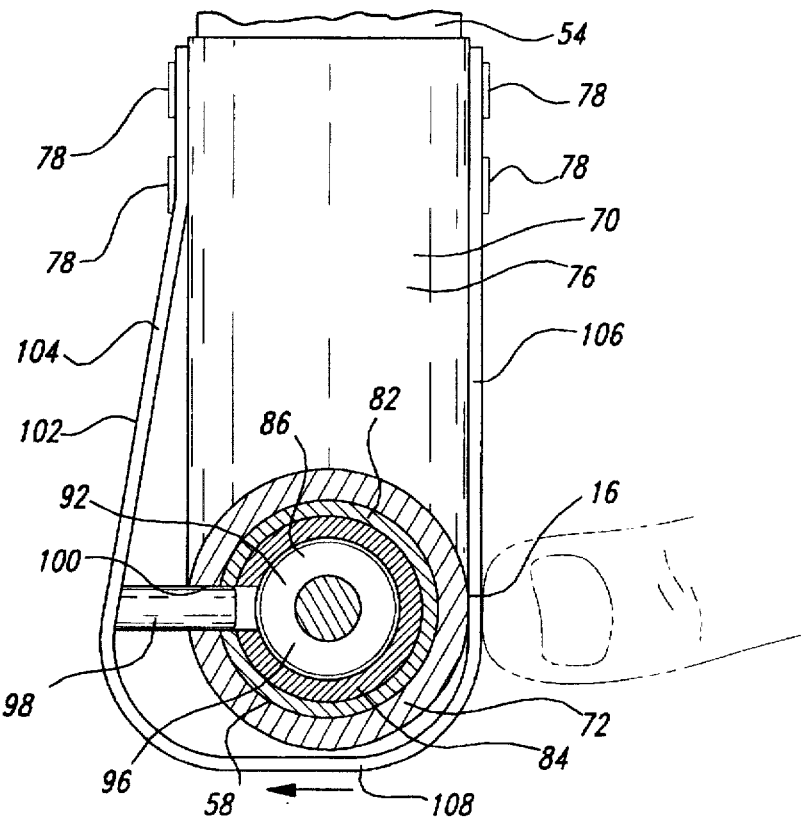
FIG. 6B is a cross-sectional, left-side view of the stroller of the lock mechanism as shown in FIG. 6A in a disengaged position to release the stub axle for removal from the rear axle.

As best seen in FIGS. 6A and 6B, the rear axle 58 includes an outer metal tube 82 and a thicker walled inner metal tube 84 snugly positioned coaxially within the outer axle tube 82. The outer and inner axle tubes 82 and 84 are fixedly connected together by the rivets 74 which also serve to fixedly attach the tubular connector portion 72 to the rear axle 58 described above. The inner axle tube 84 is open at both its left and right ends, and has a uniform interior diameter along its full length.

Figure 7:
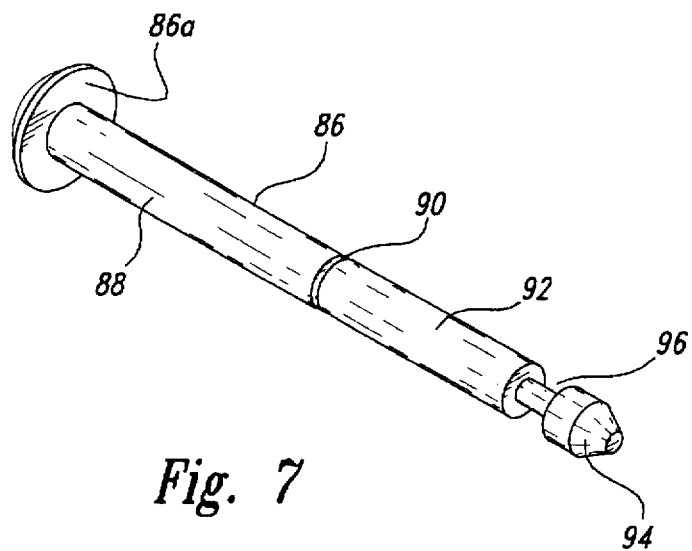
FIG. 7 is an enlarged isometric view of a stub axle used for the stroller of FIG. 3.

Referring again to FIGS. 5A and 5B, and to FIG. 7, the rear axle assembly 16 further includes left and right spindles or stub axles 86 having a circular cross-section. Each of the rear wheels 18 of the stroller 12 is rotatably mounted on an outer end portion 88 of a corresponding one of the stub axles 86 using conventional bearings. The rear wheel 18 is rotatably retained between a retainer head portion 86a of the stub axle 86 at an outer end thereof and a retainer clip (not shown) positioned in a retainer clip groove 90 located between the outer end portion 88 and an inward end portion 92 of the stub axle 86. The inward end portion 92 of each stub axle 86 is sized to be inserted into and snugly retained within the corresponding left or right end of the inner axle tube 84. In the illustrated embodiment, the inward end portion 92 of both the left and right stub axles 86 have the same diameter round cross-section so that the user can conveniently interchange the left and right rear wheels and their stub axles on the left and right ends of the inner axle tube 84.

An inward end 94 of the inward end portion 92 of each of the left and right stub axles 86 has a circumferential bevel to form a tapered end to facilitate insertion into the corresponding left or right open end of the inner axle tube 84 for attachment of the rear wheels 18 to the tubular rear axle 58. The inward end portion 92 of the stub axles 86 are sized to slide easily within the inner axle tube 84 once the user partially inserts them into the left and right open ends thereof using only a slight inward force applied by the hand of the user. Similarly, the inward end portion 92 of the stub axles 86 easily slide out of the left and right ends of the inner axle tube 84 when it is desired that the rear wheels 18 be removed for storage or transport with or without folding of the stroller 12, or for attachment of the conversion assembly 10.

The inward end portion 92 of the left and right stub axles 86 are retained within the corresponding left and right ends of the inner axle tube 84 by left and right user-actuated, releasable lock mechanisms. Each of the releasable lock mechanisms includes a circumferential groove 96 formed on the inward end portion 92 of the stub axle 86 and a movable pin 98 which extends through an aperture 100 extending fully through forward-facing wall portions of the tubular connector portion 72 of the second coupler 70 and the outer and inner axle tubes 82 and 84 of the rear axle 58. The aperture 100 extends into the interior of the inner axle tube 82 at the location aligned with the stub axle groove 96 when the inward end portion 92 of the stub axle 86 is fully inserted into the end of the inner axle tube. The pin 98 has sufficient length when in an engagement position shown in FIG. 6A to project within the stub axle groove 96 and thereby prevent axial withdrawal of the stub axle 86 from within the inner axle tube 84.

The pin 98 is held in the engagement position by a flat strip spring 102. The spring 102 has a forward leg portion 104 fixedly attached to forward-facing wall portion of the frame tube receiver portion 76 of the second coupler 70 by a first pair of the rivets 78 and carrying the pin 98. In the illustrated embodiment, the pin 98 is formed integral with the spring forward leg portion 104. The spring 102 also has a rearward leg portion 106 fixedly attached to a rearward-facing wall portion of the frame tube receiver portion 76 of the second couple 70 by a second pair of the rivets 78. The forward and rearward leg portions 104 and 106 of the spring 102 are connected together by a lower portion 108 which extends below the tubular connector portion 72 of the second coupler 70. The spring 102 is shaped and affixed to the frame tube receiver portion 76 of the second coupler 70 so that the forward leg portion 104 lays flat against the forward-facing wall portion of the frame tube receiver portion 76 and the rearward leg portion 106 is bowed away from the rearward-facing wall portion as shown in FIG. 6A. This biases the pin 98 into the engagement position within aperture 100, but the rearward leg portion 106 is bowed sufficiently to permit sufficient forward movement of the forward leg portion 104 to move the pin 98 forward to the disengagement position shown in FIG. 6B whereat the pin does not interfere with the insertion or withdrawal of the inward end portion 92 of the stub axle 86 into or from the inner axle tube 84.

When inserting the inward end portion 92 of the stub axle 86 in the end of the inner axle tube 84 to attach one of the rear wheels 18 to the frame 14, the pin 98 will be first engaged by the tapered inward end 94 of the stub axle and pushed forward into the disengagement position to permit passage thereby of the inward end portion of the stub axle. When the inward end portion 92 of the stub axle 86 is fully inserted into the inner axle tube 84, the stub axle groove 96 is in alignment with the pin 98 and the spring 102 will automatically move the pin into the engagement position within the stub axle groove, thereby locking and holding the stub axle in position during use of the stroller 12.

The stub axle 86 is removed when it is desired to remove the rear wheel 18 from the frame 14 by the user simply pressing forward on the rearward leg portion 106 of the spring 102 to move the forward leg portion 104 and the attached pin 98 forward into the disengagement position shown in FIG. 6B whereat the pin is withdrawn from the stub axle groove 96. Then, the inward end portion 92 of the stub axle is easily removed from the inner axle tube 84 by the user pulling the stub axle clear of the inner axle tube. As such, the rear wheels 18 can be quickly and easily removed and reattached to the frame 14 without tools.

The inward end portion 92 of the stub axle 86 has a circular cross-section and the stub axle groove 96 extends around the full circumference thereof so that the pin 98 will engage the groove regardless of the rotational orientation of the stub axle. Thus, the user can insert the inward end portion 92 of the stub axle 86 into the end of the inner axle tube 84 without regard for the rotational orientation of the stub axle and always achieve a secure locking of the stub axle within the inner axle tube.

An inward tubular stop 110 is positioned on the outer axle tube 82 of the rear axle 58 inward of the tubular connector portion 62 of each of the first couplers 60 and is fixedly attached to the rear axle by rivets 112. The inner tubular stop 110 and the corresponding tubular connector portion 72 of the second coupler 70 on the left and right ends of the rear axle 58 rotatably retain the first couplers 60 therebetween on the rear axle.

The conversion assembly 10 of the present invention is shown fully assembled in FIG. 1, but not attached to the stroller 12. The conversion assembly 10 includes an upper frame attachment 114 having upwardly arching left and right attachment members 116 and 118, respectively. As shown in FIGS. 2, 9, 10A and 10B, a rearward end portion or end of each of the left and right attachment members 116 and 118 (forming a rearward attachment portion of the upper frame attachment 114) is pivotally connected for movement in a substantially vertical plane to a corresponding one of the left and right upper frame tubes 24 by left and right pivot connectors 120. Each of the pivot connectors 120 is securely clamped to one of the upper frame tubes at a position just forward of the handle 26. While the left and right pivot connectors 120 allow the left and right attachment members 116 and 118 to pivot relative to the upper frame tubes 24 of the stroller, they are clamped securely enough thereto to not move along the upper frame tubes during use of the conversion assembly 10. The pivot connectors 120 are, however, flexible enough to be spread apart and removed from the left and right upper frame tubes 24 when desired. The pivot connectors 120 each use a manually operable wing nut 121 which allows the user to selectively inhibit or allow the rotation of the upper frame attachment 114 relative to the upper frame tubes 24, as needed to change the stroller between the three-wheeled stroller configuration of FIG. 10A and the two-wheeled bicycle trailer configuration of FIG. 10B.

A forward attachment member 122 forming a part of the upper frame attachment 114 extends between and is fixedly attached to forward end portions or ends of the left and right attachment members 116 and 118. In the illustrated embodiment, the left and right attachment members 116 and 118 and the forward attachment member 122 of the upper frame attachment 114 form a forward attachment portion and are integrally formed from a continuous substantially rigid tube.

The conversion assembly 10 further includes left and right side support members 124 and 126, respectively. An upper end portion or end of each of the left and right side support members 124 and 126 is pivotally connected for movement in a substantially vertical plane to a corresponding one of the left and right attachment members 116 and 118 along a forward end portion thereof rearward of the forward attachment member 122 by left and right pivot connectors 128. While the left and right pivot connectors 128 allow the left and right side support members 124 and 126 to pivot relative to the left and right attachment members 116 and 118 to facilitate changing the stroller between the three-wheeled stroller and two-wheeled bicycle trailer configurations, they are clamped securely to the left and right attachment members and secured in place by rivets 129 to prevent movement along the left and right attachment members during use of the conversion assembly 10. The upper ends of the left and right side support members 124 and 126 are removably coupled to the left and right pivot connectors 128 by removable lock pins 128a to facilitate folding of the conversion assembly 10 when removed from the stroller 12, and also to facilitate assembly and disassembly of the conversion assembly.

Figure 8:
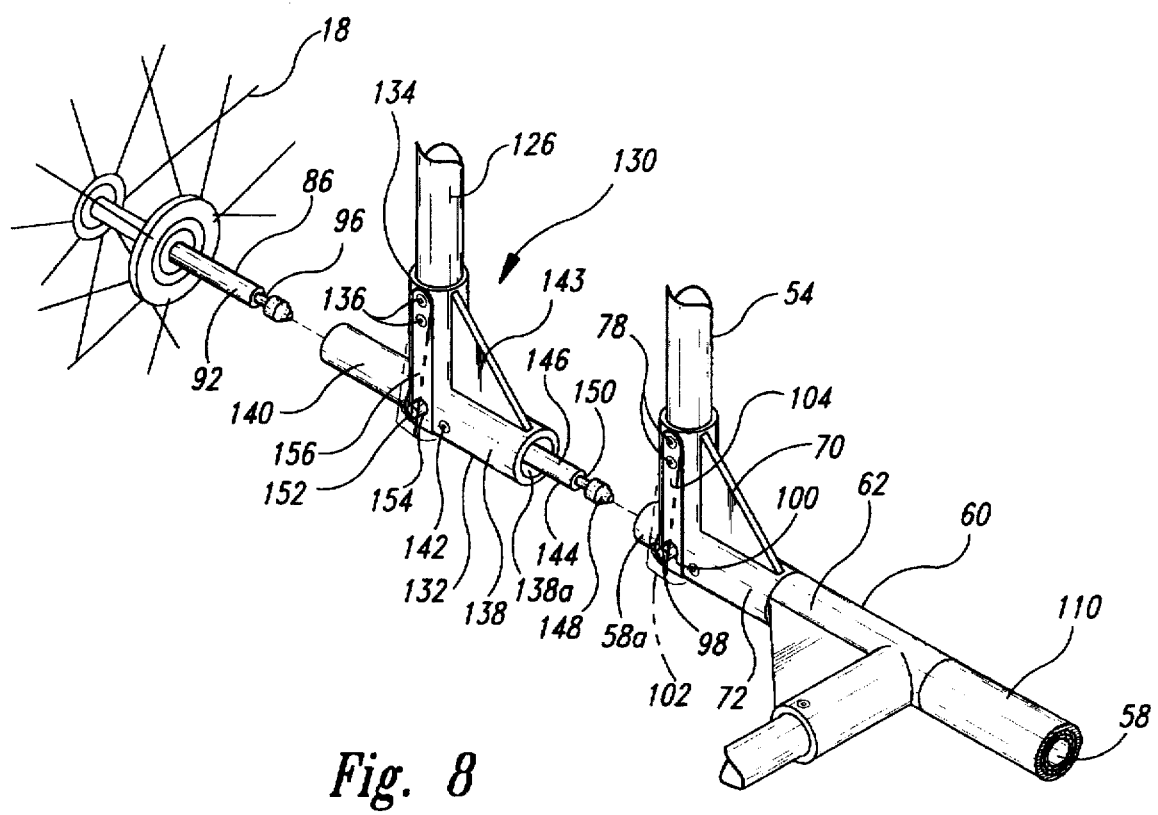
FIG. 8 is an enlarged, fragmentary, isometric view of the right side of the axle assembly of FIG. 3 with an axle extender portion of the conversion assembly of FIG. 1 shown in position for insertion into the rear axle of the stroller of FIG. 3.

A lower end portion or end of each of the left and right side support members 124 and 126 has an axle extension assembly 130 fixedly attached thereto. The axle extension assembly 130 is best shown in FIG. 8 for the right side support member 126. The axle extension assembly 130 includes a coupler 132 having a side support member receiver portion 134 within which a corresponding one of the left or right side support members 124 or 126 is inserted and fixed in place using rivets 136. The coupler 132 also has an axle extension receiver portion 138 which receives an inner end portion of a tubular axle extension 140 therein. The axle extension receiver portion 138 and the axle extension 140 are fixedly attached together by rivets 142. The axle extension 140 includes a single wall metal tube segment having the same outer diameter as the outer axle tube 82 and the same inner diameter as the inner axle tube 84 of the rear axle 58. A gusset plate 143 is fixedly attached to both the side support member receiver portion 134 and the axle extension receiver portion 138 to rigidly hold them together.

The axle extension 140 extends inward from an outer end of the axle extension receiver portion 138 only partially into the axle extension receiver portion so that the inner end thereof forms a recess 138a to receive the end portion 58a of the rear axle 58 snugly therein for increased stability. A spindle or stub axle 144 having a circular cross-section is fixedly retained in the opening of the inner end portion of the axle extension 140 and has an inward end portion 146 projecting inward therefrom. The inward end portion 146 is substantially identical to the inward end portion 92 of the stub axles 86 and is sized to be removably inserted into and snugly and rotatably retained within the corresponding left or right end of the inner axle tube 84 of the stroller rear axle 58. An inward end 148 of the inward end portion 146 of the stub axle 144 has a circumferential bevel to form a tapered end to facilitate insertion into the corresponding left or right open end of the inner axle tube 84. As with the stub axle 86, the stub axle 144 of the axle extension assembly 130 also includes a circumferential groove 150 extending around the full circumference of the stub axle. The groove 150 is positioned on the stub axle 144 so as to be in alignment with the pin 98 carried by the spring 102 of the stroller 12 such that when the stub axle 144 is fully inserted into the end of the inner axle tube 84 of the stroller rear axle 58, the pin 98 will project into the groove 150 and will prevent axial withdrawal of the stub axle 144 from within the inner axle tube 84, in the same manner as described above for the stub axle 86 which carries the rear wheel 18. As with the stub axle 86, the stub axle 144 of the axle extension assembly 130 can be quickly and easily removed when desired by the user simply pressing forward on the rearward leg portion 106 of the spring 102 to move the pin 98 forward into the disengagement position (as shown in FIG. 6B for the stub axle 86). With this arrangement, the left and right side support members 124 and 126 are free to rotate relative to the rear axle 58 and the stroller upright support tubes 54 to facilitate changing the stroller between the three-wheeled stroller and the two-wheeled bicycle trailer configurations.

The axle extension 140 extends outward beyond an outer end of the axle extension receiver portion 138 and has an opening sized to receive therein the inward end portion 92 of one of the stub axles 86 on which the rear wheels 18 are mounted. The axle extension assembly 130 uses the same user-actuated releasable lock mechanism as used with the stroller second coupler 70. This includes a movable pin 152 which extends through an aperture 154 extending through a forward facing wall portion of the side support member receiver portion 134 and the wall of the tube segment of the axle extension 140. The aperture 154 extends into the interior of the axle extension 140 at a location aligned with the stub axle groove 96 when the inward end portion 92 of the stub axle 86 is fully inserted into the end opening of the axle extension 140. The pin 152 has sufficient length when in an engagement position to project within the stub axle groove 96 and thereby prevent axial withdrawal of the stub axle 86 from within the axle extension 140. The pin 152 is held in the engagement position by a flat spring 156 having the same design as the spring 102 described above for the releasable lock mechanism of the stroller 12. The spring 156 has a forward leg portion fixedly attached to the forward facing wall portion of the side support member receiver portion 134 of the coupler 132 by the rivets 136. The forward leg portion carries the pin 152.

By using the axle extension assemblies 130 of the left and right side support members 124 and 126, the distance between the rear wheels 18 of the stroller 12 is widened for use in the two-wheeled bicycle trailer configuration and the increased wheel base provides for increased stability to reduce the likelihood of the stroller 12 tipping and rolling over when used in the bicycle trailer configuration and towed by the bicycle 13 at higher speeds greater than typically encountered when used in the three-wheeled stroller configuration.

It is noted that the attachment of the axle extension assemblies 130 to the stroller rear axle 58 also provides a secure attachment of the left and right side support members 124 and 126 to the rear axle 58 of the stroller 12. The left and right side support members 124 and 126 hold the left and right attachment members 116 and 118 securely in position and prevent them from pivoting upward or downward during use of the stroller 12 in the bicycle trailer configuration. Further, as will be described below, when the stroller 12 is towed behind the bicycle 13 a towing force is transmitted through the upper frame attachment 114 to the upper frame tubes 24 of the stroller 12. A portion of the towing force is also transmitted from the upper frame attachment 114 through the left and right side support members 124 and 126 to the left and right ends of the rear axle 58. In such fashion, the towing force applied by the bicycle 13 to the conversion assembly 10 is distributed to both the left and right upper frame tubes 24 and the left and right ends of the rear axle 58. This applies a balanced and distributed pulling force to the stroller 12 without applying too much force or an unbalanced force to any one component of the stroller. Further, the towing force is applied at points toward the rear of the stroller, not by pulling on the forward ends of the horizontal base frame tubes 22.

Figures 9, 11:
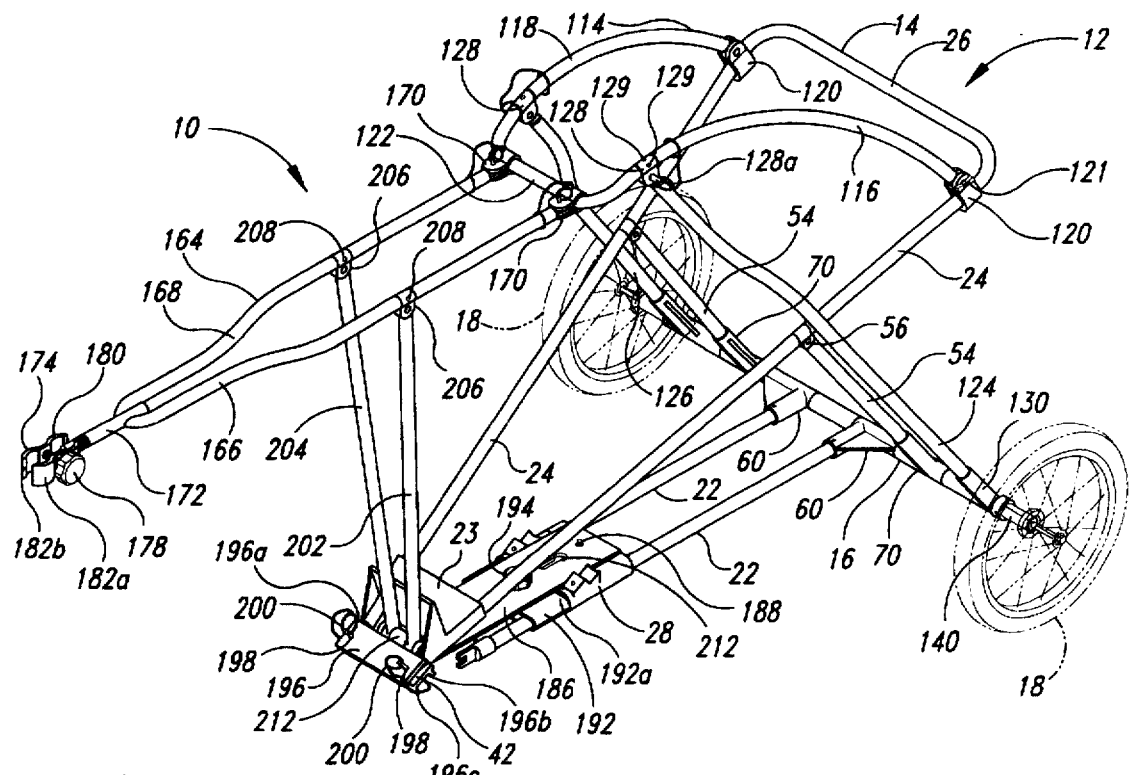
FIG. 9 is an isometric view of the conversion assembly of FIG. 1 connected to the stroller of FIG. 3 with its canopy removed and the seat of the stroller removed.
FIG. 11 is an isometric view of a portion of the conversion assembly of FIG. 1 installed on the stroller of FIG. 3 for use as a three-wheeled stroller with a canopy.

It is noted that the upper frame attachment 114 also serves to support a canopy 158, as best seen in FIGS. 2 and 11. The canopy 158 has a roof portion 159 extending between and attached to the left and right attachment members 116 and 118. The canopy 158 also has a front portion and left and right side portions, each with a clear plastic window 160 forming a portion thereof to provide visibility for an infant being carried in a fabric seat 162 (see FIGS. 10A and 10B) supported by the upper frame tubes 24. The window 160 also provides the parents with a view of the infant in the seat 162 enclosed within the canopy. The canopy 158 provides an enclosure to protect the infant in the seat 162 from any water or other matter that may fall from the sky or be kicked rearward by the rear tire of the bicycle 13, and from wind. The lower edges of the canopy 158 are tied together under the stroller seat 162. It is noted that while the upper frame attachment 114 and the left and right side support members 124 and 126 are attached to the stroller 12 to convert it to the bicycle trailer configuration, they may remain on the stroller with the canopy 158, as shown in FIG. 11, to provide protection for the infant in the seat 162 even when the stroller 12 is being used in the three-wheeled stroller configuration.

It is also noted that the upper frame attachment 114 and the left and right side support members 126 and 124 also serve as a roll-bar cage to protect the infant within the seat 162 in the event that the stroller 12 should tip and roll over when being towed as a bicycle trailer behind the bicycle 13. While in a normal use such rolling over of the stroller when configured as a two-wheeled bicycle trailer should not occur, particularly with the use of the axle extension assemblies 130, in the event of an accident produced by impact or excessively high operating speeds, the infant is provided with an extra margin of protection by the provision of the roll-bar cage.

The conversion assembly 10 further includes a tow-arm or tow-arm assembly 164 having left and right tow-arm members 166 and 168, respectively. As shown in FIGS. 1, 2, 9, 10A and 10B, a rearward end portion or end of each of the left and right tow-arm members 166 and 168 is connected to the forward attachment member 122 of the upper frame attachment 114 by left and right connectors 170. The left and right connectors 170 are clamped securely enough to the forward attachment member 122 to not move along the forward attachment member during use of the conversion assembly 10. The left and right tow-arm members 166 and 168 are removably coupled to the forward attachment member 122 by removable lock pins 170a to facilitate connection and disconnection of the tow-arm assembly 164 for use of the stroller 10 in the two-wheeled bicycle trailer configuration shown in FIG. 2 with the tow-arm assembly attached, and for use in the three-wheeled stroller configuration shown in FIG. 11 without the tow-arm assembly attached.

A forward end portion or end of each of the left and right tow-arm members 166 and 168 is fixedly attached to a hitch arm 172. The hitch arm 172 has a forward end flexibly attached to a conventional hitch 174 which can be removably clamped to a seat post 176 of the bicycle 13 just below a seat 177 thereof using a knob 178 threadably received on a threaded member 180. Manual rotation of the knob 178 securely but releasably clamps left and right clamp members 182a and 182b, respectively, about the seat post 176. The full towing force applied to the stroller 12 when converted to the two-wheeled bicycle trailer configuration is transmitted through the tow-arm assembly 164 to the forward attachment member 122 of the upper frame attachment 114. As described above, this force is then transmitted through the left and right attachment members 116 and 118 to the left and right upper frame 24, with a portion thereof transmitted from the upper frame attachment 114 through the left and right side support members 124 and 126 to the left and right ends of the rear axle 58.

Figure 10A:
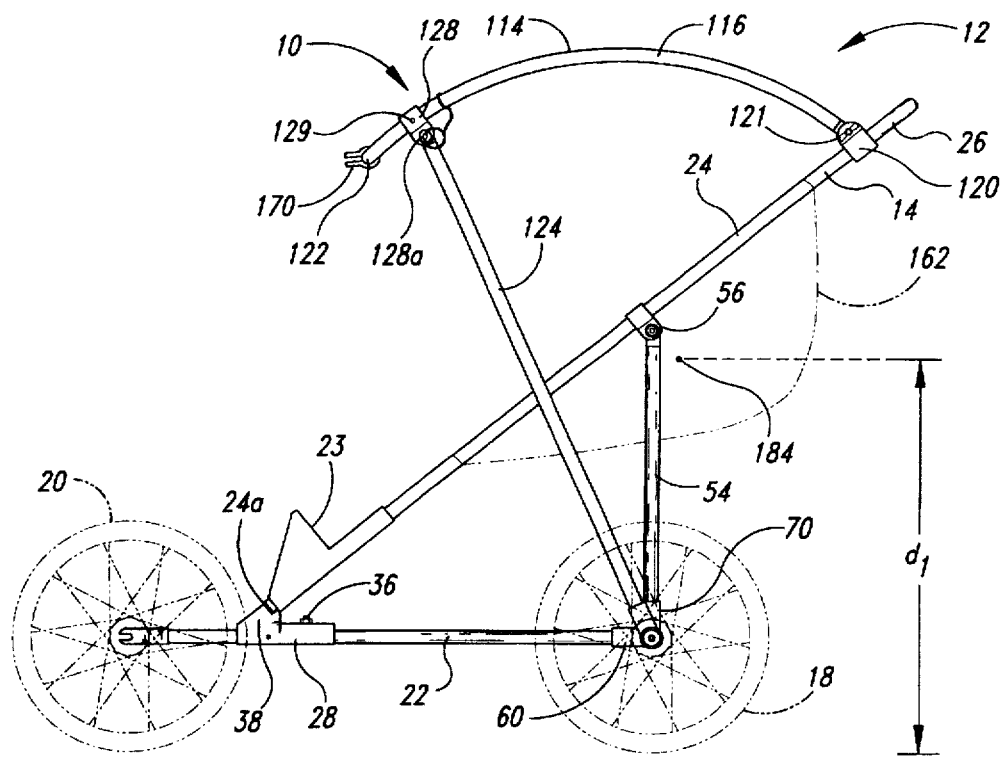
FIG. 10A is a left side elevational view of a portion of the conversion assembly of FIG. 1 installed on the stroller of FIG. 3, with its canopy removed and the stroller in the upright position.

As described above, when the stroller 12 is used in the three-wheeled stroller configuration in FIGS. 3 and 10A, the lower terminal ends 24a of the upper frame tubes 24 are releasably coupled to the horizontal base frame tubes 22 by the frame connector 28. This is accomplished by the tongue portions 42 of the fittings 44 fixedly attached to the upper frame tubes being received in the connector portions 38. When in this position, the frame 14 of the stroller 12 is configured as shown in FIG. 10A. It is noted that FIG. 10A shows attachment of the upper frame attachment 114 and the left and right side support members 124 and 126 which allows the stroller to be used in the three-wheeled stroller configuration with the canopy 158 attached as shown in FIG. 11. In this configuration, the approximate center of gravity of the infant in the seat 162 is located at a point 184 shown in FIG. 10A which is almost directly above the rear axle 58 of the stroller 12. While the overall center of gravity of the stroller 12 with the infant in the seat 162 is somewhat forward of the rear axle 58, the front wheel 20 of the stroller can be easily lifted off of the ground for turning or going over an obstacle by the user pressing downward on the handle 26.

Figure 10B:
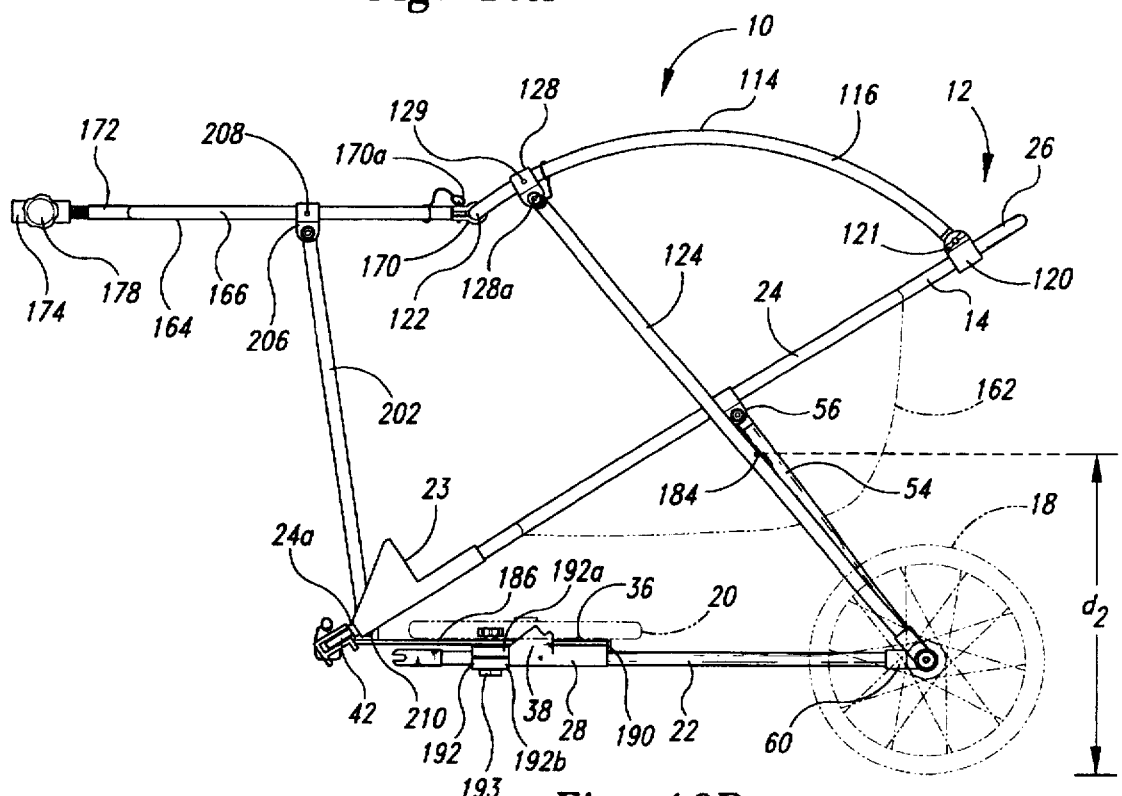
FIG. 10B is a left side elevational view of the conversion assembly of FIG. 1 fully installed on the stroller of FIG. 3 with its canopy removed and an upper frame of the stroller moved forward to lower the seat of the stroller for use as a two-wheeled bicycle trailer.

When the stroller 12 is in the two-wheeled bicycle trailer configuration, it is desirable that the overall center of gravity of the stroller be moved forward and lowered to produce greater stability of the stroller when being towed at high speeds in the bicycle trailer configuration. To accomplish this, the conversion assembly 10 includes an elongated base frame attachment or baseplate 186 which is positionable between the left and right connector portions 38 of the frame connector 28 as shown in FIG. 9. With the front wheel 20 removed, the baseplate 186 is positioned over the bridge portion 34 of the frame connector 28 in longitudinal alignment with the horizontal base frame tubes 22. The baseplate 186 has an aperture 188 positioned to coincide with the bolt 36 which holds the front wheel caliper brake of the stroller in place. The aperture 188 is sized to allow the bolt 36 to project freely through the aperture. A rearward end of the baseplate 186 has a downwardly projecting first stop or lip 190, which as best shown in FIG. 10B is positioned at a rearward end of the bridge portion 34 of the frame connector 28. The baseplate 186 also includes a downwardly projecting second stop or lip 191 positioned forward of the first lip and a forward end of the bridge portion 34 of the frame connector. The lips 190 and 191 help to properly locate the baseplate on the bridge portion 34 and also helps prevent the baseplate from sliding forward or rearward relative to the horizontal base frame tubes 22 of the stroller 12 when used in the bicycle trailer configuration.

The baseplate 186 has a releasable connector or clamp 192 positioned therebelow which clamps the baseplate to both of the base frame tubes 22. The clamp 192 includes an upper clamp member 192a fixedly attached to the underside of the baseplate and a lower clamp member 192b. A threaded wing nut 193 (see FIG. 10B) is positioned below the lower clamp member 192b and is threadably received on a threaded member which is fixedly attached to a manually rotatable knob 194 positioned above the baseplate and extends downward through the baseplate through an aperture in the baseplate. To attach the baseplate 186 to the horizontal base frame tubes 22, the knob 194 is turned while holding the wing nut 193 against rotation to spread the upper and lower clamp members 192a and 192b apart and then the baseplate is positioned between the connector portions 38 of the frame connector 28 with the upper clamp member 192a above the horizontal base frame tubes 22 and the lower clamp member 192b below them. The knob 194 is then turned to pull the lower clamp member 192b toward the upper clamp member 192a and securely clamp the baseplate 186 to the horizontal base frame tubes 22 of the stroller 12. As noted, when properly positioned the aperture 188 will have the bolt 36 located therewithin and the downwardly projecting lip 190 will be at the rearward end of the bridge portion 34 of the frame connector 28. The baseplate 186 is a rigid metal plate with sufficient strength that it will not bend significantly under the loads encountered while using the stroller 12 in the two-wheeled bicycle trailer configuration.

As best illustrated in FIGS. 1 and 9, an elongated upper frame connector 196, having a U-shaped cross section, is fixedly attached to a front end portion of the baseplate 186. The connector 196 is formed by an upper plate 196a and a lower plate 196b which are spaced apart by a sufficient distance to snugly receive the tongue portions 42 of the fittings 44 attached to the lower terminal ends 24a of the upper frame tubes 24 therewithin. The upper and lower plates 196a and 196b are fixedly attached together at a forward end thereof by a forward end wall 196c. The upper plate 196a has a pair of spaced apart apertures 198 positioned so that when the tongue portions 42 of the fittings 44 are positioned within the space between the upper and lower plates 196a and 196b the apertures 198 will be aligned with the apertures 48 of the tongue portions. The apertures 48 and 198 are sized to receive removable lock pins 200 to securely hold the tongue portions 42 in place within the connector 196 during use of the stroller 12 in the two-wheeled bicycle trailer configuration, as shown in FIGS. 2, 9 and 10B.

As illustrated in FIG. 10B, when the tongue portions 42 of the fittings 44 attached to the upper frame tubes 24 are positioned within the connector 196, the approximate center of gravity of the infant in the seat 162 indicated by the point 184 is moved forward from its location shown in FIG. 10A for the three-wheeled stroller configuration. This is because the connector 196 attached to the baseplate 186 is positioned at a forward end of the baseplate significantly forward of the connector portions 38 of the frame connector 28. When the baseplate 186 is clamped to the horizontal base frame tubes 22 using the clamp 192, the lock pins 50 (see FIG. 4) are removed and the tongue portions 42 are removed from the slots 40 of the connector portions 38. As shown in FIG. 10B, the upper frame tubes 24 are rotated about the pivot joints 56 and the lower ends thereof are moved forward. When in this position, the tongue portions 42 are then inserted into the connector 196 and the lock pins 200 inserted into the apertures 198 and through the apertures 48 of the tongue portions 42 to secure the tongue portions therein. In doing so, the seat 162 and hence the approximate center of gravity indicated by point 184 is moved forward relative to the rear wheels 18, and also lowered. As shown in FIG. 10A, the approximate center of gravity shown as point 184 is at a distance $d_1$ above the ground level when in the three-wheeled stroller configuration. When in the two-wheeled bicycle trailer configuration shown in FIG. 10B, the approximate center of gravity indicated by point 184 is at the height $d_2$ above the ground level, with the distance $d_2$ being significantly less than the distance $d_1$. As such, not only does the approximate center of gravity move significantly forward of the rear axle 58, but it is also lowered to provide significantly increased stability of operation at the higher speeds which are encountered when pulling the stroller 12 in the two-wheeled bicycle trailer configuration with the bicycle 13. This provides increased safety to the infant riding in the seat 162 from accidental tilting and rolling over.

It is noted that when the upper frame tubes 24 are moved as described above from the three-wheeled stroller configuration shown in FIG. 10A to the two-wheeled bicycle trailer configuration shown in FIG. 10B, not only do the upper frame tubes 24 rotate relative to the upright support tubes 54 about the pivot joints 56, but if the upper frame attachment 114 and the left and right side support members 124 and 126 are already attached to the frame 14 of the stroller 12, as shown in FIG. 10A, it is necessary for them to also rotate relative to the frame and to each other. This is allowed by the upper frame attachment 114 being pivotally coupled to the left and right upper frame tubes 24 by the pivot connectors 120 and to the left and right side support members 124 and 126 by the pivot connectors 128. With such pivotal connection of the components, the stroller 12 can be easily and quickly converted between the three-wheeled stroller configuration and the two-wheeled bicycle trailer configuration using the conversion assembly 10.

Since when in the two-wheeled bicycle trailer configuration the front wheel 20 of the stroller 12 is removed, it is necessary to support the forward end of the horizontal base frame tubes 22 to prevent them from rotating downward and contacting in the ground. To accomplish this, the conversion assembly 10 includes left and right side suspension members 202 and 204, respectively. An upper end portion or end of each of the left and right side suspension members 202 and 204 is pivotally connected for movement in a left or right laterally inclined plane to a corresponding one of the left and right tow-arm members 166 and 168 of the tow-arm assembly 164 along a mid portion thereof by left and right pivot connectors 206. While the left and right pivot connectors 206 allow the left and right side suspension members 202 and 204 to pivot relative to the left and right tow-arm members 166 and 168, they are clamped securely to the left and right tow-arm members and secured in place by rivets 208 to prevent movement along the left and right tow-arm members during use of the conversion assembly 10.

A lower end portion or end of each of the left and right side suspension members 202 and 204 is pivotally connected for movement in the left or right laterally inclined plane to a forward end of the baseplate 186 just rearward of the connector 196 by a hinge pin 210. The hinge pin 210 extends between tabs 212 fixedly attached to the baseplate 186. The lower ends of the left and right side suspension members 202 and 204 are connected to the baseplate 186 by the pivot pin 210 and the tabs 212 with a closer spacing therebetween than the upper ends of the left and right side suspension members where connected to the left and right tow-arm members 166 and 168. This provides the suspension members when viewed from the front or rear with a V-shaped configuration. The pivotal connection of the upper and lower ends of the left and right side suspension members to the left and right tow-arm members and the baseplate is provided to allow folding for compact storage of the conversion assembly 10 when removed from the stroller. During use in the bicycle trailer configuration no pivotal movement is intended at these pivotal connections.

When the hitch 174 is clamped to the seat post 176 of the bicycle 13, the left and right side support members 124 and 126 which extend between the upper frame attachment 114 and the rear axle 58 hold the upper frame attachment 114 in position and prevent it from dropping downward. Since the horizontal base frame tubes 22 are pivotally connected to the rear axle 58 through the first couplers 60 and are rotatable relative to the rear axle, without support the horizontal base frame tubes 22 of the stroller are free to rotate downward under the weight of the stroller and the weight of the infant being carried in the seat 162. The left and right side suspension members 202 and 204 provide the needed support by extending between the left and right tow-arm members 166 and 168 and the baseplate 186, which is clamped to the horizontal base frame tubes 22. They serve to hold the forward end of the stroller up to prevent it from rotating downward into contact with the ground. The length of the left and right suspension members 202 and 204 is selected to hold the horizontal base frame tubes 22 of the stroller in a position generally parallel to the ground when in the two-wheeled bicycle trailer configuration of FIG. 10B at about the same height as does the front wheel 20 when in the three-wheeled stroller configuration of FIG. 10A. The left and right side suspension members 202 and 204 are connected to the left and right tow-arm members 166 and 168 so as to have a slight forward upward slant. The left and right side support members 124 and 126, the left and right tow-arm members 166 and 168, the hitch arm 172, and the left and right side suspension members 202 and 204 are manufactured from substantially rigid tubes.

When the front wheel 20 of the stroller 12 is removed for use in the two-wheeled bicycle trailer configuration, it is desirable to have a place to carry the front wheel along in case it is desired to change the stroller back to the three-wheeled stroller configuration. With the conversion assembly 10, the removed front wheel can be positioned in a horizontal attitude above the baseplate 186 and supported by the baseplate below the upper frame tubes 24 and rearward of the connecting member 196 as shown in FIG. 10B. In this position the removed front wheel 20 is sufficiently below the seat 162 so that it does not interfere with use of the stroller in the bicycle trailer configuration. To secure the removed front wheel 20 in position on the baseplate 186, the baseplate has an elongated slot 212 having an enlarged rearward end opening portion 214. The slot 212 is located rearward of the clamp 192 and forward of the second lip 191 at a position to be forward of the bridge portion 34 of the frame connector 28. Thus, the slot 212 is readily accessible from above and below the baseplate 186.

The enlarged portion 214 of the slot 212 is sized to allow the axle and wheel nut threaded thereon of the removed front wheel 20 to freely move therethrough when the removed front wheel is initially placed on the baseplate 186. With the axle of the removed front wheel 20 extending through the enlarged portion 214 and the wheel nut threaded thereon positioned below the baseplate 186, the removed front wheel is moved forward to position the axle of the front wheel in the forward narrow portion of the slot 212. The wheel nut is larger than the width of the slot and can be tightened from below the baseplate 186 to clamp the removed front wheel 20 securely to the baseplate while being carried during use of the stroller in the two-wheeled bicycle trailer configuration.

The conversion assembly 10 when attached to the stroller 12 in the two-wheeled bicycle trailer configuration of FIG. 10B provides an extremely stable and roll resistant bicycle trailer. In the past, prior art three-wheeled strollers that were converted to two-wheeled bicycle trailers had an unacceptable tendency to tip and roll over during usage. This typically occurred when one rear wheel of the trailer hit a curb or rock so as to quickly and severely lift only the one side of the bicycle trailer. It also sometimes occurred when the bicycle pulling the bicycle trailer attempted a high speed curve or sharp corner turn and the force picked up the inside wheel of the stroller when in the bicycle trailer configuration. One significant benefit of the conversion assembly 10 of the present invention is that its construction reduces the chances for tipping and rolling of the stroller when in the bicycle trailer configuration. In part, this is accomplished because of the axle extension assemblies 130 that provide a wider rear wheel base, and the movement of the center of gravity of the infant in the seat 162 significantly forward of the rear axle 58 and lower than when the stroller 12 is used as a three-wheeled stroller. Increasing the rear wheel base produces a higher rotational inertia.

Further, by connecting the tow-arm assembly 164 to the seat post 176 of the bicycle 13 just under the seat 177 and extending it rearward to engage an upper portion of the upper frame tubes 24 at two spaced apart locations toward the rear of the stroller, the towing forces are transmitted from a high point on the bicycle to a high point on the stroller, both of which are significantly higher than the approximate center of gravity indicated by point 184 of the infant in the seat 162 and of the general center of gravity of the stroller with the infant in the seat. With this arrangement, the stroller 12 when in the two-wheeled bicycle trailer configuration tends to have a line of towing extending from just under the seat 177 of the bicycle 13 to the handle 26 of the stroller. Further, the axis of rotation of the stroller produced by the forces which tend to tip and roll the stroller extends from just under the seat 177 to the ground contact point of the rear wheel 18 of the stroller opposite the rear wheel being lifted to produce the tipping and rolling. This axis of rotation is much higher, relative to the center of gravity, than prior art bicycle trailers converted from three-wheeled strollers. As such, gravity acts as a restoring force through a greater angular displacement during tipping and rolling than with such prior art bicycle trailers. Hence, the use of the conversion assembly 10 of the present invention produces a bicycle trailer which is safer and less inclined to tip and roll.

To further inhibit tipping and rolling, the left and right side suspension members 202 and 204 are designed to apply a downward force to the stroller to counter any upward force on one of the rear wheels that tends to tip and roll the stroller. Any such upward force is transmitted through the stroller frame 14 to the left and right side suspension members 202 and 204 to the tow-arm assembly 164 that is clamped at its forward end to the seat post 176 of the bicycle 13 and tends to lift the bicycle and the adult rider thereon. However, this upward force is countered with the significant downward force produced by the weight of the adult rider and the bicycle, which tends to offset the upward force and significantly inhibit tipping and rolling of the stroller. The same result occurs to the extent the lifting force is transmitted through the left or right side support members 124 and 126.

The left and right side suspension members 202 and 204 further act to inhibit tipping and rolling when the bicycle 13 is ridden through a high-speed curve. To illustrate this, consider the bicycle 13 turning to the left and naturally leaning to the left. The tendency for the stroller 12 in such a situation is for the inside or left rear wheel 18 to lift upward, particularly if it hits a bump, and roll about the outside or right rear wheel. However, since the bicycle 13 is being leaned to the left side in such a left hand turn, part of the weight of the leaning adult bicycle rider and the leaning bicycle tends to be offloaded from the rear wheel of the bicycle and transferred back to the stroller through the left and right tow-arm members 166 and 168 and the left and right side suspension members 202 and 204 to the rear wheels of the stroller. This tends to further inhibit tipping and rolling of the stroller when turning.

As previously noted, with the conversion assembly 10 of the present invention, even should the stroller tip and roll over, the upper frame attachment 114 and the left and right side support members 124 and 126 form a roll cage to protect the infant in the seat 162. When the stroller 12 is in the two-wheeled bicycle trailer configuration of FIG. 10B, the tow-arm assembly 164 and the left and right side suspension members 202 and 204 also tend to add protective structure to protect the infant in the seat 162 during a roll.

It will be appreciated that, although a specific embodiment of the invention has been described herein for purposes of illustration, various modifications may be made without departing from the spirit and scope of the invention. Accordingly, the invention is not limited except as by the appended claims.

We claim:

1. A conversion assembly for use with a baby stroller having a forward wheel, left and right rearward wheels rotatably mounted on left and right stub axles, a rear axle having left and right ends with corresponding left and right end openings to removably receive a corresponding one of the left and right stub axles therein, a downwardly sloping upper frame supporting a baby seat, the upper frame having a lower end and an upper end, a handle connected to the upper frame toward the upper end thereof, a base frame with a forward end and a rearward end, the forward wheel being removably attached to the base frame toward the forward end thereof, the base frame having a connector at a position toward the forward wheel to releasably attach the lower end of the upper frame to the base frame, an upwardly extending frame having a lower end and an upper end, the upper end of the upwardly extending frame being pivotally connected to the upper frame at a position between the handle and the lower end of the upper frame, the upwardly extending frame being rotatable relative to the base frame to permit the lower end of the upper frame to selectively move forward with the forward wheel removed, the conversion assembly being usable to couple the baby stroller to a bicycle having a frame supporting a bicycle seat for use as a two-wheeled bicycle trailer, comprising:

an upper frame attachment having a rearward attachment portion pivotally connectable to the upper frame at a position toward the handle and a forward attachment portion;

left and right support members, each having an upper end portion pivotally connected to said forward attachment portion and a lower end portion having an axle extension assembly, said axle extension assemblies each having an inner stub axle removably positionable in a corresponding one of the left and right end openings of the rear axle when the rearward wheel stub axle is removed therefrom, and an outer opening to removably receive a corresponding one of the left and right rearward wheel stub axles therein;

a tow-arm having a rearward tow-arm end portion connected to said forward attachment portion, and a forward tow-arm end portion positionable toward the bicycle seat;

a base frame attachment having a releasable connector securable to the base frame toward the forward end thereof, and an upper frame connector positioned forward of the connector of the base frame to releasably attach the lower end of the upper frame to the base frame attachment;

a suspension member having an upper end portion connected to said tow-arm and a lower end portion connected to said base frame attachment; and a hitch attached to said forward tow-arm end portion and attachable to the bicycle frame at a position toward the bicycle seat to couple said tow-arm to the bicycle.

2. The conversion assembly of claim 1 for use with a baby stroller upper frame having left and right upper frame members, wherein said upper frame attachment includes left and right attachment members, each having a rearward end portion pivotally connectable to a corresponding one of the left and right upper frame members and a forward end portion, and wherein said upper frame attachment further includes a forward attachment member extending between said forward end portions of said left and right attachment members, said upper end portions of said left and right support members being pivotally connected to a corresponding one of said left and right attachment members toward said forward attachment member.

3. The conversion assembly of claim 1, further including a canopy, said canopy being supported by said upper frame attachment and defining an enclosure having the baby seat therewithin when the conversion assembly is connected to the baby stroller.

4. The conversion assembly of claim 1 wherein said tow-arm includes laterally spaced-apart left and right tow-arm members, each having a rearward end portion connected to said forward attachment portion at spaced-apart locations and a forward end portion, said forward end portions of said left and right tow-arm members being connected together, said hitch being connected to both said forward end portions of said left and right tow-arm members.

5. The conversion assembly of claim 4 wherein said suspension member includes laterally spaced-apart left and right suspension members, each having an upper end portion connected to a corresponding one of said left and right tow-arm members at a spaced-apart distance, and a lower end portion connected to said base frame attachment with a distance therebetween less than said spaced-apart distance of said upper end portions, whereby said left and right suspension members have a generally V-shaped arrangement when viewed from the direction of the rear axle.

6. The conversion assembly of claim 5 wherein said left and right suspension members have said upper end portions thereof connected to said left and right tow-arm members at a location forward of a location at which said lower end portions thereof are connected to said base frame attachment, whereby said left and right suspension members generally slant forwardly upward.

7. The conversion assembly of claim 1 wherein said base frame attachment includes a plate.

8. The conversion assembly of claim 7 for use with a baby stroller having the forward wheel comprising a tire rotatably mounted on a threaded axle and a nut threadably received thereon, wherein said plate includes an aperture with a first portion sized to allow free passage of the forward wheel axle and nut therethrough to allow positioning of the tire on one side of said plate and the nut on an opposite side with the forward wheel axle extending through the aperture, and a second portion continuous with said first portion and into which the forward wheel axle can be moved while remaining within said aperture, said second portion having a width less than a width of the forward wheel nut such that the nut can be tightened to clamp said plate between the nut and the forward wheel tire.

9. The conversion assembly of claim 1 wherein said base frame attachment includes a downwardly extending stop positioned to engage the connector of the base frame and prevent movement of said base frame attachment relative to the base frame.

10. The conversion assembly of claim 1 wherein said releasable connector of said base frame attachment is a clamp engageable with the base frame.

11. The conversion assembly of claim 1 for use with a baby stroller rear axle having left and right end portions, wherein said inner stub axles of said axle extension assemblies are each retained within a recess in said axle extension assemblies, said recess being sized to snugly receive therein a corresponding one of the left and right end portions of the rear axle.

12. The conversion assembly of claim 11 wherein the left and right end portions of the rear axle are rotatably receivable in said recesses of said axle extension assemblies.

13. The conversion assembly of claim 1 wherein said left and right support members hold said upper frame attachment with said forward attachment portion thereof elevated at a height substantially at or above a height at which said rearward attachment portion is connectable to the upper frame.

14. The conversion assembly of claim 13 wherein said tow-arm extends forward from said forward attachment portion at a height substantially at or above said height of said forward attachment portion during use of the baby stroller in the two-wheeled bicycle trailer configuration.

15. The conversion assembly of claim 1 wherein said upper frame attachment is attachable to the upper frame at a position above the baby seat such that when said hitch is coupled to the bicycle frame a line of towing force extends at a height above the baby seat.

16. The conversion assembly of claim 1 wherein said tow-arm and said upper frame attachment are rigidly attached together and said upper frame attachment is held against movement relative to the upper frame during use of the baby stroller in the two-wheeled bicycle trailer configuration by said left and right support members to provide a substantially rigid tow coupling between the baby stroller and the bicycle.

17. The conversion assembly of claim 1 wherein said suspension member has a length to hold said base frame attachment and the base frame to which connected at a height above the ground out of contact therewith during use of the baby stroller in the two-wheeled bicycle trailer configuration.

18. The conversion assembly of claim 1 wherein said rearward tow-arm portion is connected to said forward attachment portion by a releasable connector, and said suspension member lower end portion is connected to said base frame attachment by a releasable connector, whereby when both said tow-arm and suspension member releasable connectors are released, said tow-arm and said suspension member can be removed from the baby stroller for its use as a three-wheeled baby stroller.

19. A conversion assembly for use with a baby stroller having a forward wheel, left and right rearward wheels rotatably and removably mounted on a rear axle having left and right ends, a downwardly sloping upper frame supporting a baby seat, the upper frame having a lower end and an upper end, a handle connected to the upper frame toward the upper end thereof, a base frame with a forward end and a rearward end, the forward wheel being removably attached to the base frame toward the forward end thereof, the base frame having a connector at a position toward the forward wheel to releasably attach the lower end of the upper frame to the base frame, an upwardly extending frame having a lower end and an upper end, the upper end of the upwardly extending frame being connected to the upper frame, the upwardly extending frame being rotatable relative to the base frame to permit the lower end of the upper frame to selectively move forward with the forward wheel removed, the conversion assembly being usable to couple the baby stroller to a bicycle having a frame supporting a bicycle seat for use as a two-wheeled bicycle trailer, comprising:

- an upper frame attachment having a rearward attachment portion connectable to the upper frame at a position toward the handle and a forward attachment portion;
- left and right support members, each having an upper end portion connected to said forward attachment portion and a lower end portion having an axle extension assembly, said axle extension assemblies each having an axle attachment portion removably attachable to a corresponding one of the left and right ends of the rear axle when the rearward wheel is removed therefrom, and a wheel attachment portion on which a corresponding one of the left and right rearward wheels is rotatably and removably mountable;
- a tow-arm having a rearward tow-arm end portion connected to said forward attachment portion, and a forward tow-arm end portion positionable toward the bicycle seat;
- a base frame attachment having a releasable connector securable to the base frame toward the forward end thereof, and an upper frame connector positioned forward of the connector of the base frame to releasably attach the lower end of the upper frame to the base frame attachment;
- a suspension member having an upper end portion connected to said tow-arm and a lower end portion connected to said base frame attachment; and
- a hitch attached to said forward tow-arm end portion to the bicycle frame at a position toward the bicycle seat to couple said tow-arm to the bicycle.

20. The conversion assembly of claim 19 for use with a baby stroller upper frame having left and right upper frame members, wherein said upper frame attachment includes left and right attachment members, each having a rearward end portion connectable to a corresponding one of the left and right upper frame members and a forward end portion, said upper end portions of said left and right support members being connected to a corresponding one of said left and right attachment members.

21. The conversion assembly of claim 20 wherein said upper frame attachment further includes a forward attachment member extending between said forward end portions of said left and right attachment members, and said rearward tow-arm end portion is connected to said forward attachment member.

22. The conversion assembly of claim 19 wherein said tow-arm includes laterally spaced-apart left and right tow-arm members, each having a rearward end portion connected to said forward attachment portion at spaced-apart locations and a forward end portion, said forward end portions of said left and right tow-arm members being connected to said hitch.

23. The conversion assembly of claim 22 wherein said suspension member includes laterally spaced-apart left and right suspension members, each having an upper end portion connected to a corresponding one of said left and right tow-arm members, and a lower end portion connected to said base frame attachment.

24. The conversion assembly of claim 23 wherein said left and right suspension members have said upper end portions thereof connected to said left and right tow-arm members at a location forward of a location at which said lower end portions thereof are connected to said base frame attachment.

25. The conversion assembly of claim 19 wherein said base frame attachment includes a plate.

26. The conversion assembly of claim 19 wherein said base frame attachment includes first and second downwardly extending stops, said first stop being positioned to engage the connector of the base frame and prevent forward movement and said second stop being positioned to engage the connector of the base frame and prevent rearward movement of said base frame attachment relative to the base frame.

27. The conversion assembly of claim 19 wherein said releasable connector of said base frame attachment is a clamp engageable with the base frame.

28. The conversion assembly of claim 19 for use with a baby stroller rear axle having left and right end portions, wherein said axle attachment portions of said axle extension assemblies each have a recess therein sized to snugly receive therein a corresponding one of the left and right end portions of the rear axle.

29. The conversion assembly of claim 19 wherein said left and right support members hold said upper frame attachment with said forward attachment portion thereof elevated at a height substantially at or above a height at which said rearward attachment portion is connectable to the upper frame.

30. The conversion assembly of claim 29 wherein said tow-arm extends forward from said forward attachment portion at a height substantially at or above said height of said forward attachment portion during use of the baby stroller in the two-wheeled bicycle trailer configuration.

31. The conversion assembly of claim 19 wherein said upper frame attachment is attachable to the upper frame at a position above the baby seat such that when said hitch is coupled to the bicycle frame a line of towing force extends at a height above the baby seat.

32. The conversion assembly of claim 19 wherein said tow-arm and said upper frame attachment are rigidly attached together and said upper frame attachment is held against movement relative to the upper frame during use of the baby stroller in the two-wheeled bicycle trailer configuration by said left and right support members to provide a substantially rigid tow coupling between the baby stroller and the bicycle.

33. The conversion assembly of claim 19 for use with a baby stroller upper frame having left and right upper frame members, wherein said upper frame attachment includes left and right attachment members, each having a rearward end portion connectable to a corresponding one of the left and right upper frame members and a forward end portion, said upper end portions of said left and right support members being connected to a corresponding one of said left and right attachment members.

34. The conversion assembly of claim 33 wherein said upper frame attachment further includes a forward attachment member extending between said forward end portions of said left and right attachment members, and said rearward tow-arm end portion is connected to said forward attachment member.

35. The conversion assembly of claim 34 wherein said left and right support members hold said left and right attachment members to position said forward attachment member elevated at a height substantially at or above a height at which said rearward end portions of said left and right attachment members are connectable to the left and right upper frame members.

36. The conversion assembly of claim 34 wherein said tow-arm includes laterally spaced-apart left and right tow-arm members, each having a rearward end portion connected to said forward attachment member at spaced-apart locations and a forward end portion, said forward end portions of said left and right tow-arm members being connected to said hitch.

37. The conversion assembly of claim 36 wherein said suspension member includes laterally spaced-apart left and right suspension members, each having an upper end portion connected to a corresponding one of said left and right tow-arm members, and a lower end portion connected to said base frame attachment.

38. The conversion assembly of claim 37 wherein said left and right suspension members have said upper end portions thereof connected to said left and right tow-arm members at a location forward of a location at which said lower end portions thereof are connected to said base frame attachment.

39. The conversion assembly of claim 37 wherein said base frame attachment includes a plate.

40. The conversion assembly of claim 37 wherein said base frame attachment includes a downwardly extending stop positioned to engage the connector of the base frame and prevent forward and rearward movement of said base frame attachment relative to the base frame.

41. The conversion assembly of claim 37 wherein said releasable connector of said base frame attachment is a clamp engageable with the base frame.

42. The conversion assembly of claim 37 for use with a baby stroller rear axle having left and right end portions, wherein said axle attachment portions of said axle extension assemblies each have a recess therein sized to snugly receive therein a corresponding one of the left and right end portions of the rear axle.

43. The conversion assembly of claim 36 wherein said left and right tow-arm members extend forward from said forward attachment member at a height substantially at or above said height of said forward attachment member during use of the baby stroller in the two-wheeled bicycle trailer configuration.

44. The conversion assembly of claim 36 wherein said left and right upper frame members are attachable to the upper frame at positions above the baby seat such that when said hitch is coupled to the bicycle frame a line of towing force extends at a height above the baby seat.

45. The conversion assembly of claim 36 wherein said left and right tow-arm members and said forward attachment member are rigidly attached together and said left and right attachment members are held against movement relative to the left and right upper frame members during use of the baby stroller in the two-wheeled bicycle trailer configuration by said left and right support members to provide a substantially rigid tow coupling between the baby stroller and the bicycle.

46. A baby stroller convertible between operation as a three-wheeled stroller and a two-wheeled trailer towed behind a cycle having a cycle frame supporting a cycle seat, comprising:

a forward wheel;

left and right rearward wheels rotatably mounted on left and right stub axles;

a rear axle having left and right ends with corresponding left and right end openings to removably receive a corresponding one of said left and right stub axles therein;

a downwardly sloping upper frame supporting a baby seat, said upper frame having a lower end and an upper end;

a handle connected to said upper frame toward said upper end thereof;

a base frame with a forward end and a rearward end, said forward wheel being removably attached to said base frame toward said forward end thereof, said base frame having a connector at a position toward said forward wheel to releasably attach said lower end of said upper frame to said base frame;

an upwardly extending frame having a lower end and an upper end, said upper end of said upwardly extending frame being pivotally connected to said upper frame at a position between said handle and said lower end of said upper frame, said upwardly extending frame being rotatable relative to said base frame to permit said lower end of said upper frame to selectively move forward with said forward wheel removed;

an upper frame attachment having a rearward attachment portion pivotally connected to said upper frame at a position toward said handle and a forward attachment portion;

left and right support members, each having an upper end portion pivotally connected to said forward attachment portion and a lower end portion having an axle extension assembly, said axle extension assemblies each having an inner stub axle removably positionable in a corresponding one of said left and right end openings of said rear axle when said rearward wheel stub axle is removed therefrom, and an outer opening to removably receive a corresponding one of said left and right rearward wheel stub axles therein;

a tow-arm having a rearward tow-arm end portion connected to said forward attachment portion, and a forward tow-arm end portion positionable toward said cycle seat;

a base frame attachment having a releasable connector securable to said base frame toward said forward end thereof, and an upper frame connector positioned forward of said connector of said base frame to releasably attach said lower end of said upper frame to said base frame attachment;

a suspension member having an upper end portion connected to said tow-arm and a lower end portion connected to said base frame attachment; and a hitch attached to said forward tow-arm end portion to couple said tow-arm to said cycle frame at a position toward said cycle seat.

47. The convertible baby stroller of claim 46 wherein said upper frame has left and right upper frame members, wherein said upper frame attachment includes left and right attachment members, each having a rearward end portion pivotally connected to a corresponding one of said left and right upper frame members and a forward end portion, and wherein said upper frame attachment further includes a forward attachment member extending between said forward end portions of said left and right attachment members, said upper end portions of said left and right support members being pivotally connected to a corresponding one of said left and right attachment members toward said forward attachment member.

48. The convertible baby stroller of claim 46 wherein said tow-arm includes laterally spaced-apart left and right tow-arm members, each having a rearward end portion connected to said forward attachment portion at spaced-apart locations and a forward end portion, said forward end portions of said left and right tow-arm members being connected together, said hitch being connected to both said forward end portions of said left and right tow-arm members.

49. The convertible baby stroller of claim 48 wherein said suspension member includes laterally spaced-apart left and right suspension members, each having an upper end portion connected to a corresponding one of said left and right tow-arm members at a spaced-apart distance, and a lower end portion connected to said base frame attachment with a distance therebetween less than said spaced-apart distance of said upper end portions, whereby said left and right suspension members have a generally V-shaped arrangement when viewed from the direction of said rear axle.

50. The convertible baby stroller of claim 49 wherein said left and right suspension members have said upper end portions thereof connected to said left and right tow-arm members at a location forward of a location at which said lower end portions thereof are connected to said base frame attachment, whereby said left and right suspension members generally slant forwardly upward.

51. The convertible baby stroller of claim 46 wherein said base frame attachment includes a plate.

52. The convertible baby stroller of claim 51 wherein said forward wheel includes a tire rotatably mounted on a threaded axle and a nut threadably received thereon, and wherein said plate includes an aperture with a first portion sized to allow free passage of said forward wheel axle and nut therethrough to position said tire on one side of said plate and said nut on an opposite side with said forward wheel axle extending through said aperture, and a second portion continuous with said first portion and into which said forward wheel axle can be moved while remaining within said aperture, said second portion having a width less than a width of said forward wheel nut such that said nut can be tightened to clamp said plate between said nut and said forward wheel tire.

53. The convertible baby stroller of claim 46 wherein said base frame attachment includes a stop positioned to engage said connector of said base frame and prevent forward and rearward movement of said base frame attachment relative to said base frame.

54. The convertible baby stroller of claim 46 wherein said releasable connector of said base frame attachment is a clamp engageable with said base frame.

55. The convertible baby stroller of claim 46 wherein said rear axle has left and right end portions, and wherein said inner stub axles of said axle extension assemblies are each retained within a recess in said axle extension assemblies, said recess being sized to snugly receive therein a corresponding one of said left and right end portions of said rear axle.

56. The convertible baby stroller of claim 55 wherein said left and right end portions of said rear axle are rotatably received in said recesses of said axle extension assemblies.

57. The convertible baby stroller of claim 46 wherein said left and right support members hold said upper frame attachment with said forward attachment portion thereof elevated at a height substantially at or above a height at which said rearward attachment portion is connected to said upper frame.

58. The convertible baby stroller of claim 57 wherein said tow-arm extends forward from said forward attachment portion at a height substantially at or above said height of said forward attachment portion.

59. The convertible baby stroller of claim 46 wherein said upper frame attachment is attachable to said upper frame at a position above said baby seat such that when said hitch is coupled to the bicycle frame a line of towing force extends at the height above said baby seat.

60. The convertible baby stroller of claim 46 wherein said tow-arm and said upper frame attachment are rigidly attached together and said upper frame attachment is held against movement relative to said upper frame during use of the baby stroller in the two-wheeled bicycle trailer configuration by said left and right support members to provide a substantially rigid tow coupling between the baby stroller and the bicycle.

61. A conversion assembly for use with a baby stroller having a forward wheel, left and right rearward wheels rotatably mounted on a rear axle having left and right ends, an upper frame supporting a baby seat, the upper frame having a lower end and an upper end, a handle connected to the upper frame toward the upper end thereof, a base frame with a forward end and a rearward end, the forward wheel being removably attached to the base frame toward the forward end thereof, the conversion assembly being usable to couple the baby stroller to a bicycle having a frame supporting a bicycle seat for use as a two-wheeled bicycle trailer, comprising:

an upper frame attachment having a rearward attachment portion connectable to the upper frame at a position toward the handle and a forward portion;

a suspension member having an upper end portion connectable to said forward portion of said upper frame attachment and a lower end portion releasably connectable to the base frame toward the forward end of the base frame; and a hitch connectable to said forward portion of said upper frame attachment to couple said upper frame attachment to the bicycle frame at a position toward the bicycle seat.

62. The conversion assembly of claim 61 wherein said suspension member has a length to hold the forward end of the base frame at a height above the ground out of contact therewith during use of the baby stroller in the two-wheeled bicycle trailer configuration.

63. The conversion assembly of claim 61 wherein said upper frame attachment is attachable to the upper frame and positionable when said hitch is coupled to the bicycle frame to produce a line of towing force extending at a height above the baby seat.

64. A conversion assembly for use with a baby stroller having a forward wheel, left and right rearward wheels rotatably mounted on a rear axle having left and right ends, an upper frame supporting a baby seat, the upper frame having a lower end and an upper end, a handle connected to the upper frame toward the upper end thereof, a base frame with a forward end and a rearward end, the forward wheel being removably attached to the base frame toward the forward end thereof, the conversion assembly being usable to couple the baby stroller to a bicycle having a frame supporting a bicycle seat for use as a two-wheeled bicycle trailer, comprising:

an upper frame attachment having a rearward attachment portion connectable to the upper frame at a position toward the handle and a forward portion;

left and right support members, each having an upper end portion connectable to said upper frame attachment and a lower end portion removably connectable to the rear axle toward a corresponding one of the left and right ends of the rear axle;

a suspension member having an upper end portion connectable to said forward portion of said upper frame attachment and a lower end portion releasably connectable to the base frame toward the forward end of the base frame; and a hitch connectable to said forward portion of said upper frame attachment to couple said upper frame attachment to the bicycle frame at a position toward the bicycle seat.

65. The conversion assembly of claim 64 for use with a baby stroller having the left and right wheels removably mounted on the rear axle, wherein said lower end portion of each of said left and right support members has an axle extension assembly, said axle extension assemblies each having an axle attachment portion removably connectable to a corresponding one of the left and right ends of the rear axle when the rearward wheel is removed therefrom, and a wheel attachment portion on which a corresponding one of the left and right rearward wheels is rotatably and removably mountable.

66. The conversion assembly of claim 64 wherein said suspension member has a length to hold the forward end of the base frame at a height above the ground out of contact therewith during use of the baby stroller in the two-wheeled bicycle trailer configuration.

67. The conversion assembly of claim 64 wherein said upper frame attachment is attachable to the upper frame and positionable when said hitch is coupled to the bicycle frame to produce a line of towing force extending at a height above the baby seat.

68. The conversion assembly of claim 64 wherein said left and right support members hold said upper frame attachment with said forward portion thereof elevated at a height substantially at or above a height at which said rearward attachment portion is connectable to the upper frame.

69. The conversion assembly of claim 64 wherein said upper frame attachment is held against movement relative to the upper frame during use of the baby stroller in the two-wheeled bicycle trailer configuration by said left and right support members to provide a substantially rigid tow coupling between the baby stroller and the bicycle.

70. A conversion assembly for use with a baby stroller having a forward wheel, left and right rearward wheels rotatably mounted on a rear axle having left and right ends, an upper frame supporting a baby seat, the upper frame having a lower end and an upper end, a handle connected to the upper frame toward the upper end thereof, a base frame with a forward end and a rearward end, the forward wheel being removably attached to the base frame toward the forward end thereof, the base frame having a connector at a position toward the forward wheel to releasably attach the lower end of the upper frame to the base frame, an upwardly extending frame having a lower end and an upper end, the upper end of the upwardly extending frame being connected to the upper frame, the upwardly extending frame being rotatable relative to the base frame to permit the lower end of the upper frame to selectively move forward with the forward wheel removed, the conversion assembly being usable to couple the baby stroller to a bicycle having a frame supporting a bicycle seat for use as a two-wheeled bicycle trailer, comprising:

an upper frame attachment having a rearward attachment portion connectable to the upper frame at a position toward the handle and a forward portion;

a base frame attachment having a releasable connector securable to the base frame toward the forward end thereof, and an upper frame connector positioned forward of the connector of the base frame to releasably attach the lower end of the upper frame to the base frame attachment;

a suspension member having an upper end portion connectable to said forward portion of said upper frame attachment and a lower end portion connected to said base frame attachment; and a hitch connectable to said forward portion of said upper frame attachment to couple said upper frame attachment to the bicycle frame at a position toward the bicycle seat.

71. The conversion assembly of claim 70 wherein said suspension member has a length to hold said base frame attachment and the forward end of the base frame to which connected at a height above the ground out of contact therewith during use of the baby stroller in the two-wheeled bicycle trailer configuration.

72. The conversion assembly of claim 70 wherein said upper frame attachment is attachable to the upper frame and positionable when said hitch is coupled to the bicycle frame to produce a line of towing force extending at a height above the baby seat.

73. A conversion assembly for use with a baby stroller having a forward wheel, left and right rearward wheels rotatably mounted on a rear axle having left and right ends, an upper frame supporting a baby seat, the upper frame having a lower end and an upper end, a handle connected to the upper frame toward the upper end thereof, a base frame with a forward end and a rearward end, the forward wheel being removably attached to the base frame toward the forward end thereof, the base frame having a connector at a position toward the forward wheel to releasably attach the lower end of the upper frame to the base frame, an upwardly extending frame having a lower end and an upper end, the upper end of the upwardly extending frame being connected to the upper frame, the upwardly extending frame being rotatable relative to the base frame to permit the lower end of the upper frame to selectively move forward with the forward wheel removed, the conversion assembly being usable to couple the baby stroller to a bicycle having a frame supporting a bicycle seat for use as a two-wheeled bicycle trailer, comprising:

an upper frame attachment having a rearward attachment portion connectable to the upper frame at a position toward the handle and a forward portion;

left and right support members, each having an upper end portion connectable to said upper frame attachment and a lower end portion removably connectable to the rear axle toward a corresponding one of the left and right ends of the rear axle;

a base frame attachment having a releasable connector securable to the base frame toward the forward end thereof, and an upper frame connector positioned forward of the connector of the base frame to releasably attach the lower end of the upper frame to the base frame attachment;

a suspension member having an upper end portion connectable to said forward portion of said upper frame attachment and a lower end portion connected to said base frame attachment; and a hitch connectable to said forward portion of said upper frame attachment to couple said upper frame attachment to the bicycle frame at a position toward the bicycle seat.

74. The conversion assembly of claim 73 for use with a baby stroller having the left and right wheels removably mounted on the rear axle, wherein said lower end portion of each of said left and right support members has an axle extension assembly, said axle extension assemblies each having an axle attachment portion removably connectable to a corresponding one of the left and right ends of the rear axle when the rearward wheel is removed therefrom, and a wheel attachment portion on which a corresponding one of the left and right rearward wheels is rotatably and removably mountable.

75. The conversion assembly of claim 73 wherein said suspension member has a length to hold said base frame attachment and the forward end of the base frame to which connected at a height above the ground out of contact therewith during use of the baby stroller in the two-wheeled bicycle trailer configuration.

76. The conversion assembly of claim 73 wherein said upper frame attachment is attachable to the upper frame and positionable when said hitch is coupled to the bicycle frame to produce a line of towing force extending at a height above the baby seat.

77. The conversion assembly of claim 73 wherein said left and right support members hold said upper frame attachment with said forward portion thereof elevated at a height substantially at or above a height at which said rearward attachment portion is connectable to the upper frame.

78. The conversion assembly of claim 73 wherein said upper frame attachment is held against movement relative to the upper frame during use of the baby stroller in the two-wheeled bicycle trailer configuration by said left and right support members to provide a substantially rigid tow coupling between the baby stroller and the bicycle.

79. A conversion assembly for use with a baby stroller having a forward wheel, left and right rearward wheels rotatably mounted on a rear axle having left and right ends, an upper frame supporting a baby seat, the upper frame having a lower end and an upper end, a handle connected to the upper frame toward the upper end thereof, a base frame with a forward end and a rearward end, the forward wheel being removably attached to the base frame toward the forward end thereof, the conversion assembly being usable to couple the baby stroller to a bicycle having a frame supporting a bicycle seat for use as a two-wheeled bicycle trailer, comprising:

an upper frame attachment having a rearward attachment portion connectable to the upper frame at a position spaced away from the base frame and a forward portion;

a suspension member having an upper end portion connectable to said forward portion of said upper frame attachment and a lower end portion releasably connectable to the base frame; and a hitch connectable to said forward portion of said upper frame attachment to couple said upper frame attachment to the bicycle frame at a position toward the bicycle seat.

80. The conversion assembly of claim 79 wherein said suspension member has a length to hold the forward end of the base frame at a height above the ground out of contact therewith during use of the baby stroller in the two-wheeled bicycle trailer configuration.

81. The conversion assembly of claim 79 wherein said upper frame attachment is attachable to the upper frame and positionable when said hitch is coupled to the bicycle frame to produce a line of towing force extending at a height above the baby seat.

82. The conversion assembly of claim 79, further including left and right support members, each having an upper end portion connectable to said upper frame attachment and a lower end portion removably connectable to the rear axle toward a corresponding one of the left and right ends of the rear axle.

* * * * *